United States Patent
Yamazaki et al.

(10) Patent No.: US 9,068,721 B2
(45) Date of Patent: Jun. 30, 2015

(54) ILLUMINATION OPTICAL SYSTEM FOR IMAGE PICKUP APPARATUS

(71) Applicant: Fujitsu Frontech Limited, Tokyo (JP)

(72) Inventors: Kozo Yamazaki, Inagi (JP); Isao Iwaguchi, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 13/967,910

(22) Filed: Aug. 15, 2013

(65) Prior Publication Data

US 2013/0329437 A1    Dec. 12, 2013

Related U.S. Application Data

(63) Continuation of application No. PCT/JP2011/054554, filed on Feb. 28, 2011.

(51) Int. Cl.
  *F21V 5/04*        (2006.01)
  *H01L 33/58*       (2010.01)
  *F21V 13/02*       (2006.01)
  *H04N 5/225*       (2006.01)

(52) U.S. Cl.
  CPC .............. *F21V 13/02* (2013.01); *H04N 5/2256* (2013.01)

(58) Field of Classification Search
  CPC . F21Y 2101/02; F21V 17/00; F21W 2121/00
  USPC ............... 362/311.6, 311.06, 311.02, 311.09, 362/311.14
  See application file for complete search history.

(56) References Cited

U.S. PATENT DOCUMENTS

| 6,022,124 | A  | 2/2000  | Bourn et al.   |
| 6,285,787 | B1 | 9/2001  | Kawachi et al. |
| 2008/0316603 | A1 | 12/2008 | Jang et al. |

FOREIGN PATENT DOCUMENTS

| EP | 1 610 265 A1 | 12/2005 |
| EP | 1 830 306 A2 | 9/2007 |
| JP | 10-187990    | 7/1998 |
| JP | 2004-094051  | 3/2004 |
| JP | 2004-171192  | 6/2004 |
| JP | 2005-201880  | 7/2005 |
| JP | 2007-058617  | 3/2007 |

OTHER PUBLICATIONS

Japanese Official Communication mailed May 20, 2014 (with translation).

(Continued)

*Primary Examiner* — Joseph L Williams
(74) *Attorney, Agent, or Firm* — Greer Burns & Crain Ltd.

(57) ABSTRACT

An illumination optical system for an image pickup apparatus includes a plurality of light sources arranged in a circular loop pattern and a prism plate shaped like a circular loop. the prism plate includes a prism surface at which illumination light from the light sources enters and on which a plurality of prism columns arranged in a circular loop pattern in a circumference direction of the prism plate are formed and an outgoing surface from which the illumination light is emitted. the prism surface includes a flat portion on at least one of a peak formed by each of the plurality of prism columns and a trough formed between the plurality of prism columns. the flat portion is substantially parallel to a tangential direction of the prism plate.

10 Claims, 48 Drawing Sheets

(56) References Cited

OTHER PUBLICATIONS

Extended EP Search Report dated Aug. 22, 2014.

Int'l. Search Report issued in Int'l. App. No. PCT/JP2011/054554, mailed May 10, 2011.

Notice of Submission of Opinion issued by the Korean Patent Office in corresponding Korean Patent App. No. 2010-2013-7021885, issued Dec. 29, 2014 (with translation).

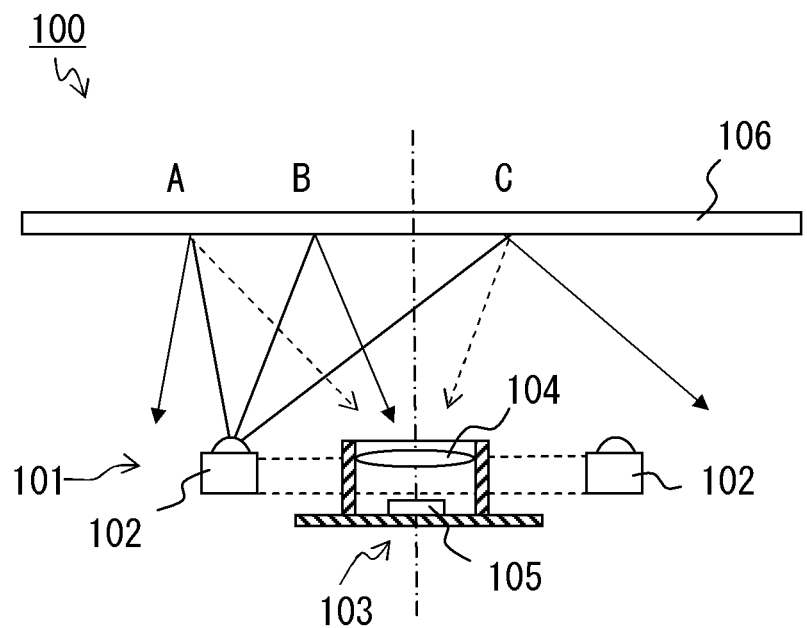
F I G. 1

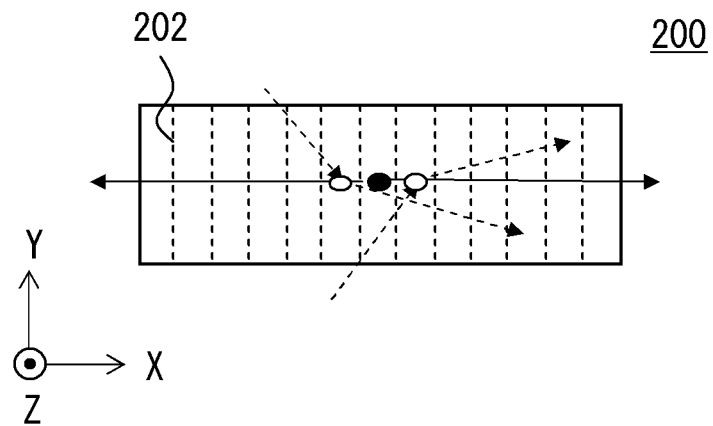
F I G. 5

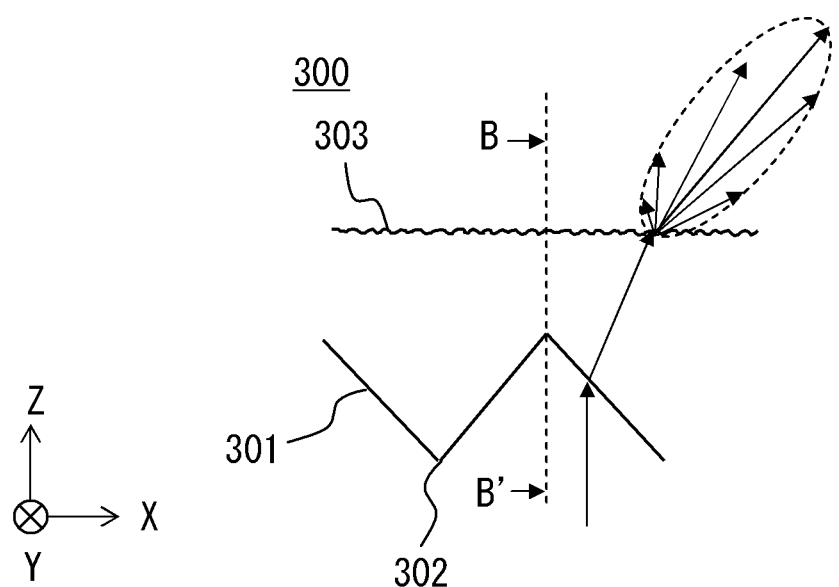
F I G. 7

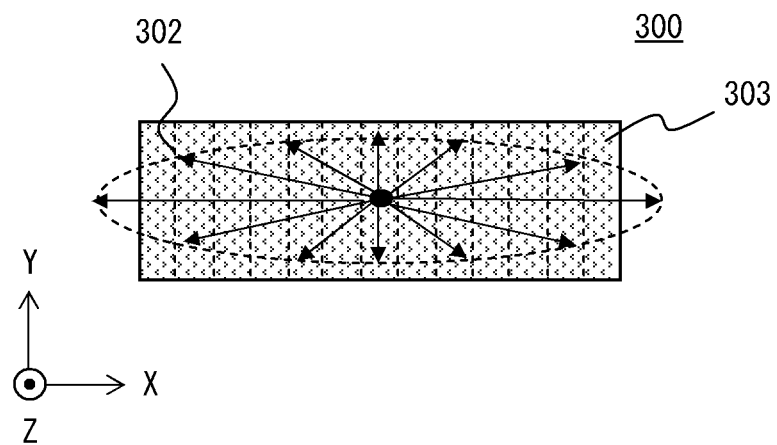
F I G. 9

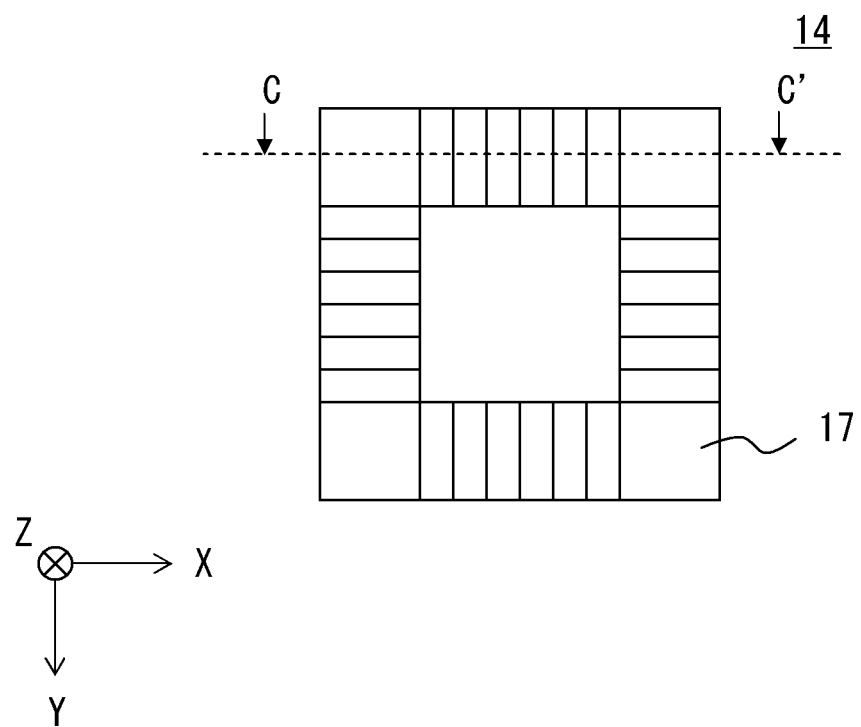
F I G. 1 2

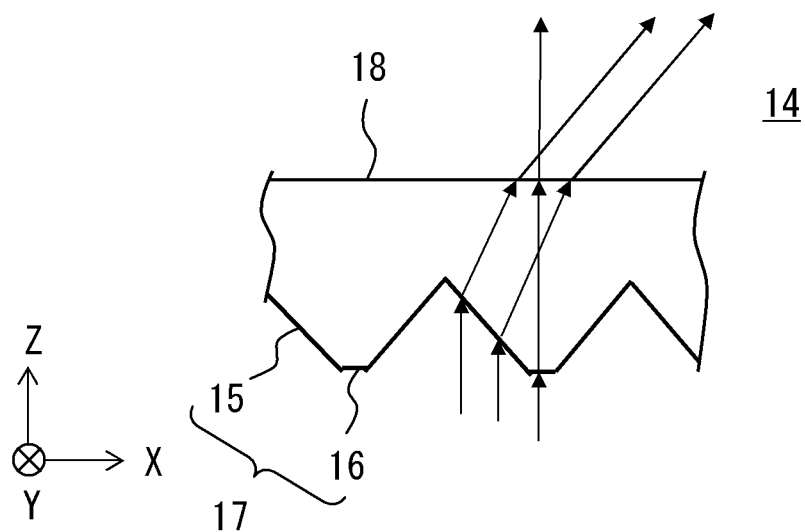
F I G. 1 3

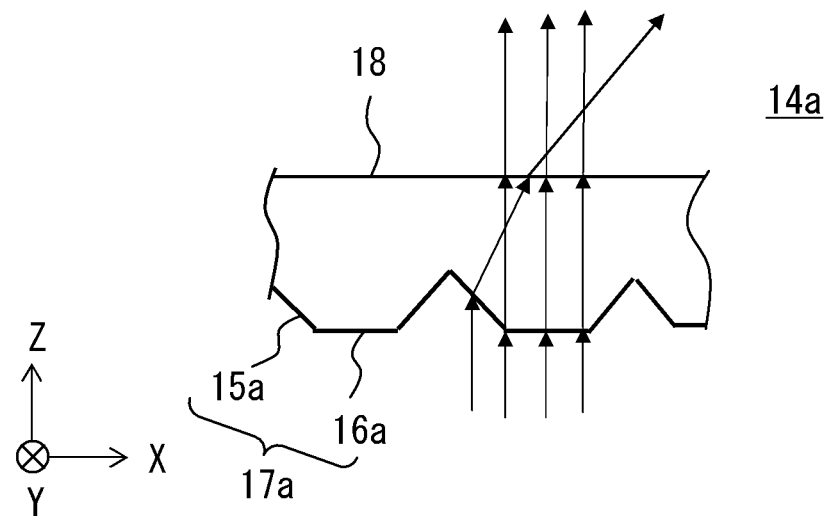
F I G. 1 5

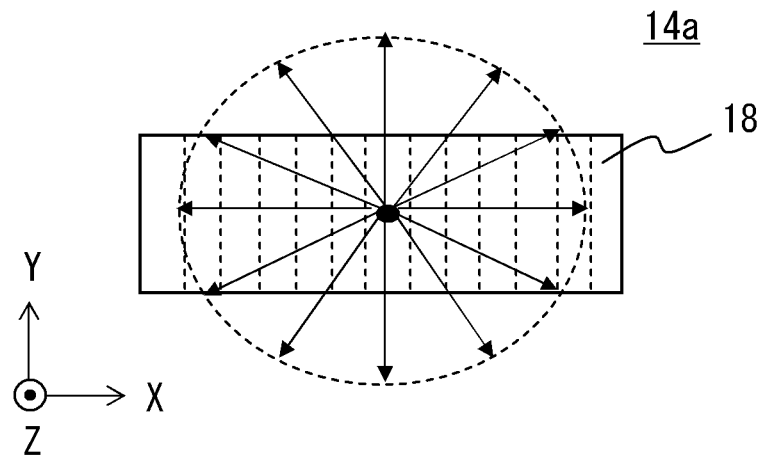
F I G. 16

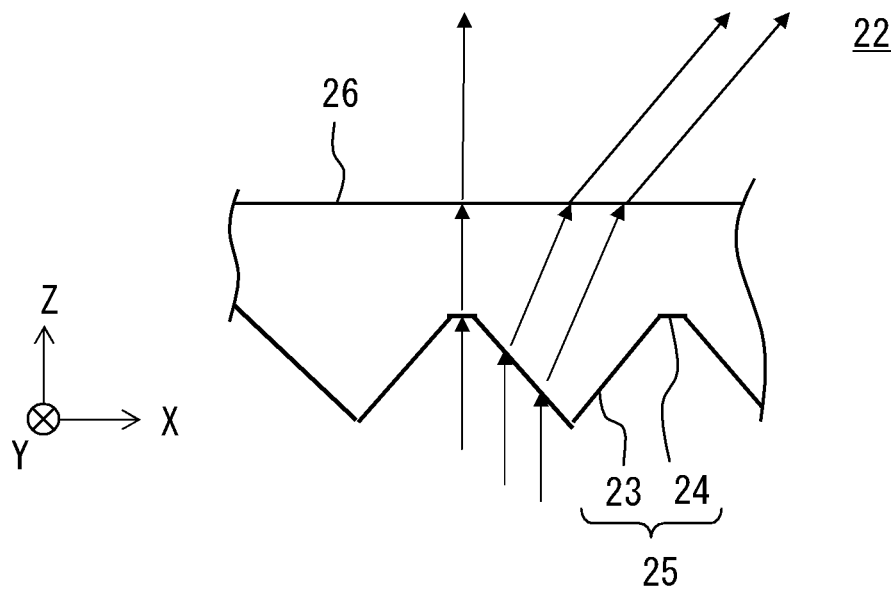
F I G. 1 8

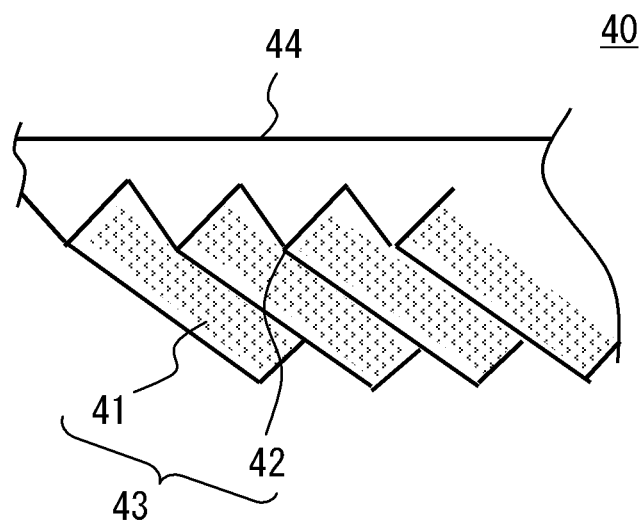
F I G. 2 2

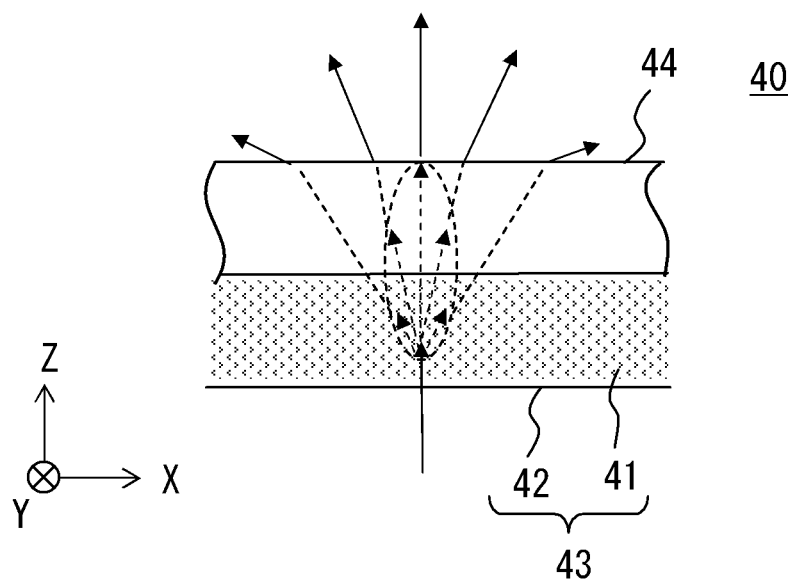
F I G. 24

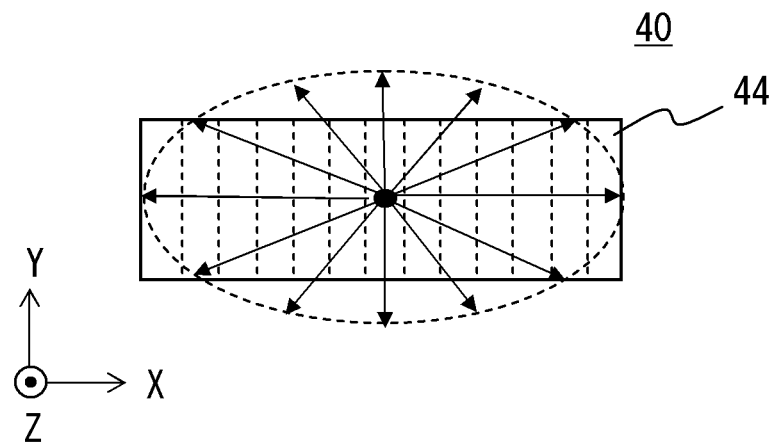
F I G. 2 5

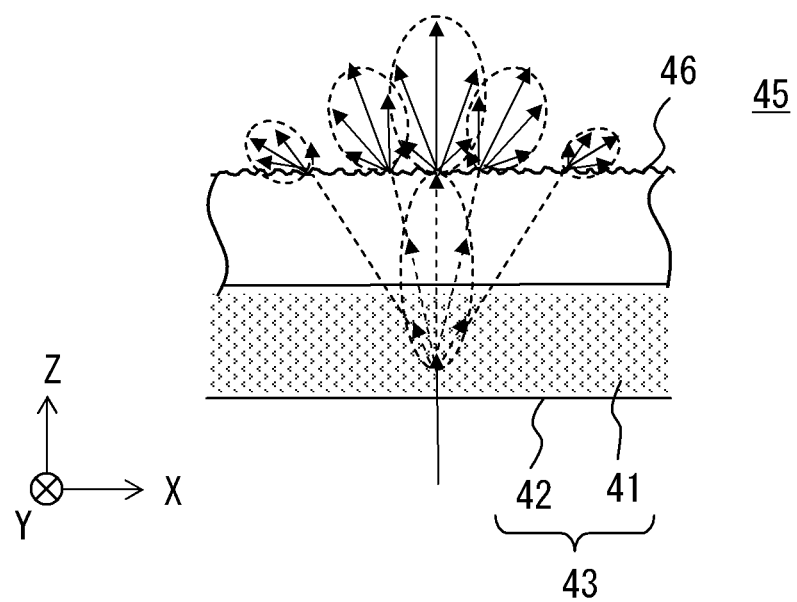
F I G. 2 7

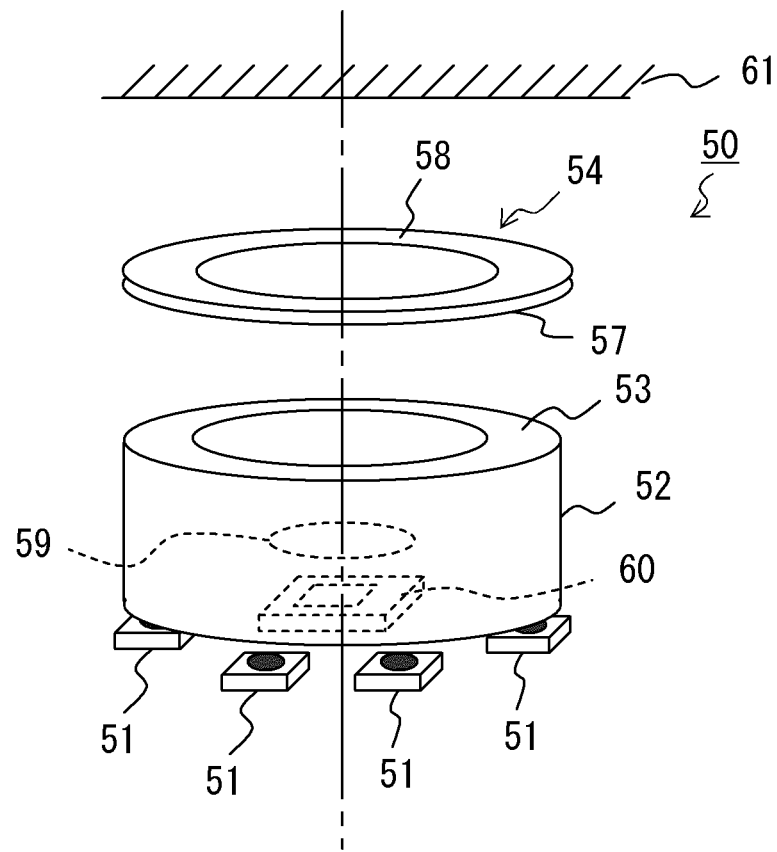
F I G. 2 9

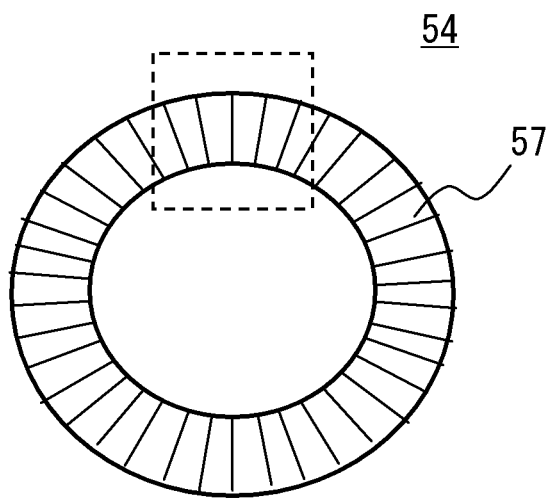
F I G. 3 1

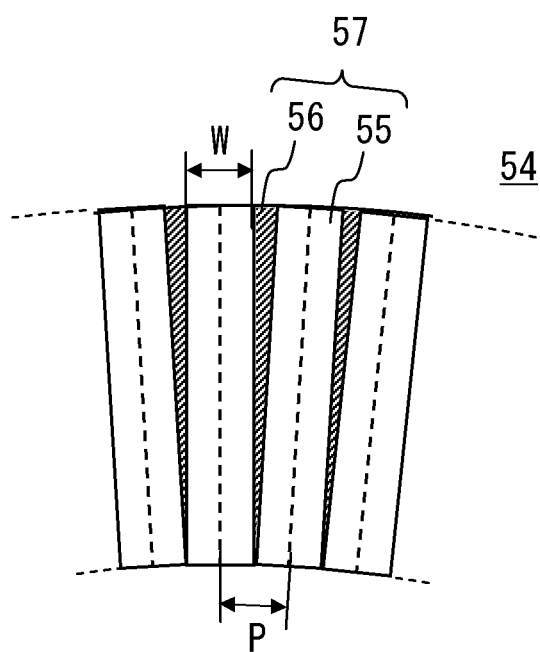
F I G. 3 2

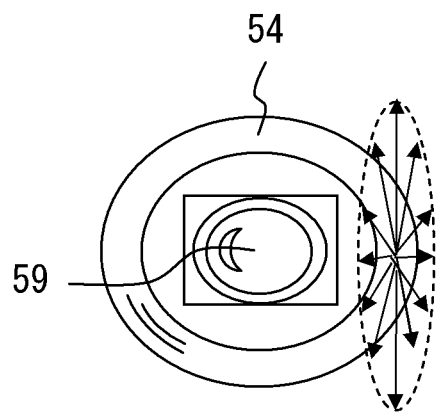
F I G. 3 3 B

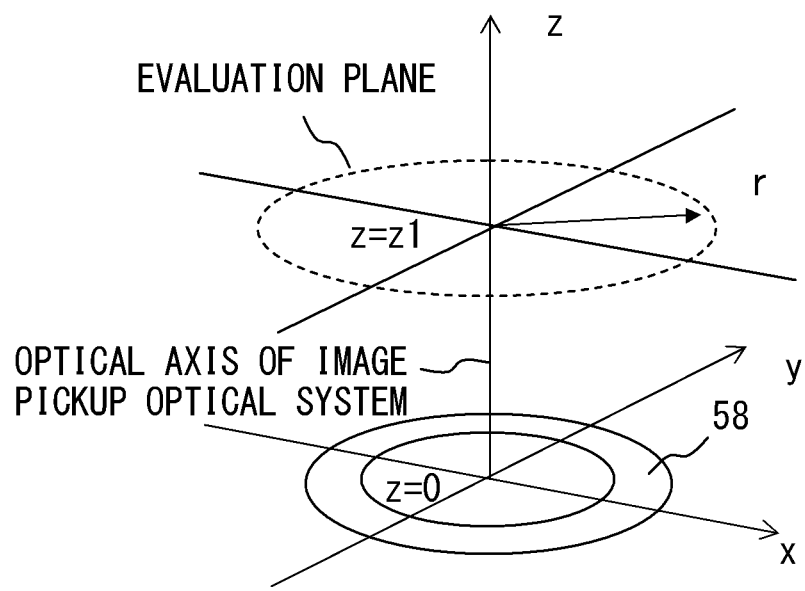
F I G. 3 4

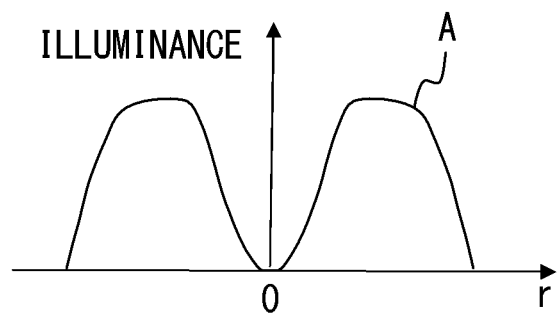
F I G. 35A

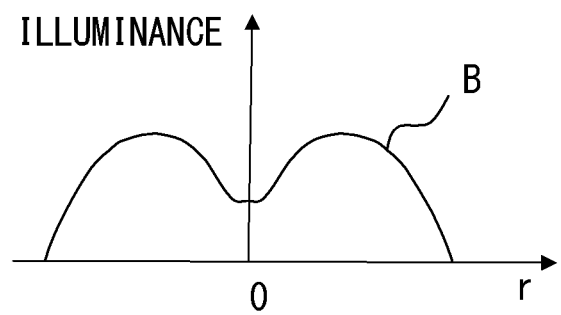
F I G. 35B

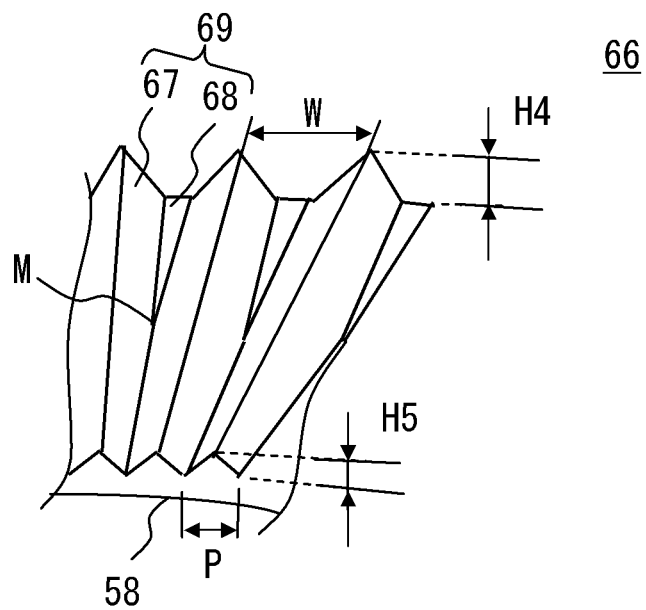
F I G. 3 9

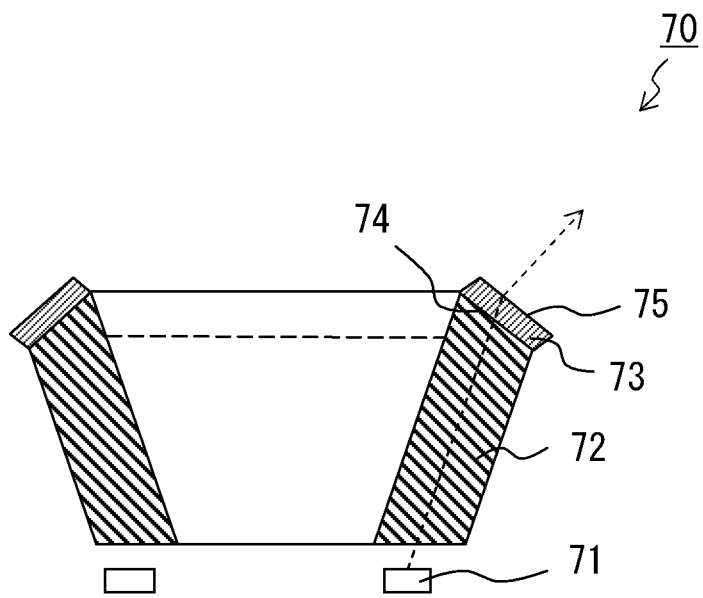
F I G. 4 1

ILLUMINATION OPTICAL SYSTEM FOR IMAGE PICKUP APPARATUS

CROSS-REFERENCE TO RELATED APPLICATION

This application is a continuation application of International PCT Application No. PCT/JP2011/054554, which was filed on Feb. 28, 2011

BACKGROUND OF THE INVENTION

1. Field of the Invention

The inventions discussed herein are related to an illumination optical system for an image pickup apparatus.

2. Description of the Related Art

Image pickup apparatuses designed to read information from a subject, such as palm-vein authentication apparatuses and barcode readers (hereinafter simply referred to as "image pickup apparatuses), are known kinds of image pickup apparatuses. An image pickup apparatus includes, for example, an illumination optical system 101 and an image pickup optical system 103, as illustrated in FIG. 1. A light source 102, such as an LED, irradiates a subject 106 with irradiation light, and an image sensor 105 provided on the image side of an image pickup lens 104 detects regular reflection light and scattered light which are both reflected by the subject 106 (e.g., a palm or a sheet on which a barcode is printed). Thereby, an image pickup apparatus 100 illustrated in FIG. 1 reads information of the subject 106.

In the meantime, as illustrated in FIG. 1, both regular reflection light (solid lines in FIG. 1) and scattered light (dashed lines in FIG. 1) having a lower light intensity than the regular reflection light are generated from each point on the surface of the subject 106 irradiated with irradiation light, but not all of the regular reflection light rays generated from the points in the field of view of the image pickup optical system 103 enter the image sensor 105. Thus, even when a point from which regular reflection light to be detected by the image sensor 105 is emitted (point B in FIG. 1) and a point from which regular reflection light not to be detected by the image sensor 105 is emitted (points A and C in FIG. 1) are illuminated at the same illuminance, the amount of detected light becomes different between these two points.

Such a difference in the amount of light caused by regular reflection light (hereinafter referred to as "regular-reflection noise") is one factor that deteriorates the reading precision of the image pickup apparatus. Thus, in the field of image pickup apparatuses, a technology has been pursued for limiting regular-reflection noise so as to improve the reading precision of the image pickup apparatuses.

In order to improve the reading precision of the image pickup apparatus by limiting regular-reflection noise, it is necessary to prevent high-luminance regions from being locally generated on a subject, but simply equalizing illuminance is insufficient. The directivity of illumination light needs to be controlled to appropriately guide light generated from a subject to the image-pickup optical system. As a technology for controlling the directivity of light, a technology is known wherein the direction in which light is emitted is controlled using a prism plate, and such a technology is disclosed by, for example, patent document 1.

FIG. 2, FIG. 3, FIG. 4, and FIG. 5 illustrate controlling the direction in which light is emitted by a prism plate in accordance with a prior art. FIG. 2 illustrates a relationship between incident light and outgoing light on an XZ cross-section of a prism plate. FIG. 3 illustrates a relationship on an XZ cross-section of the prism plate between outgoing light and the light perpendicularly incident onto the prism plate. FIG. 4 illustrates a relationship on a YZ cross-section taken on line AA' in FIG. 3 between outgoing light and the light perpendicularly incident onto the prism plate. FIG. 5 illustrates a relationship between incident light and outgoing light with the prism plate illustrated in FIG. 2 being viewed from above. The XYZ coordinate systems of FIG. 2 to FIG. 5 are right-handed orthogonal coordinate systems provided for the convenience of reference to directions.

A prism plate 200 illustrated in FIG. 2 includes: a prism surface 201 as an incidence surface on which a plurality of parallel prism columns each having a ridge line 202 are arranged in the X direction; and a plane surface 203 as an outgoing surface. The prism plate 200 allows incident light that enters from the prism-surface-201 side to be deflected by refraction at the prism surface 201 and the plane surface 203 so as to control the outgoing direction, with the result that the directivity of the outgoing light can be controlled.

Patent document 1: Japanese Laid-open Patent Publication No. 2004-171192

SUMMARY OF THE INVENTION

An aspect of the present invention provides an illumination optical system for an image pickup apparatus, the illumination optical system including: a plurality of light sources arranged in a circular loop pattern; and a prism plate shaped like a circular loop, wherein the prism plate includes: a prism surface at which illumination light from the light sources enters and on which a plurality of prism columns arranged in a circular loop pattern in a circumference direction of the prism plate are formed; and an outgoing surface from which the illumination light is emitted, wherein the prism surface includes a flat portion on at least one of a peak formed by each of the plurality of prism columns and a trough formed between the plurality of prism columns, the flat portion being substantially parallel to a tangential direction of the prism plate.

In accordance with the present invention, an illumination optical system for an image pickup apparatus may be provided that is capable of arbitrarily controlling the directivity of illumination light.

BRIEF DESCRIPTION OF THE DRAWINGS

FIG. 1 illustrates an exemplary configuration of an image pickup apparatus in accordance with a prior art designed to read information from a subject.

FIG. 5 illustrates a relationship between incident light and outgoing light with the prism plate illustrated in FIG. 2 being viewed from above.

FIG. 7 illustrates a relationship on an XZ cross-section of the prism plate illustrated in FIG. 6 between outgoing light and the light incident perpendicularly onto the prism plate.

FIG. 9 illustrates the directivity of outgoing light with the prism plate illustrated in FIG. 6 being viewed from above.

FIG. 12 is a plan view of the prism plate included in the illumination optical system illustrated in FIG. 10.

FIG. 13 illustrates a relationship on a cross section taken on line CC' in FIG. 11 between outgoing light and the light incident onto the prism plate illustrated in FIG. 10.

FIG. 15 illustrates a relationship between outgoing light and the light incident on a prism plate including a flat portion that occupies a higher proportion of a prism surface than the flat portion of the prism plate illustrated in FIG. 10 does.

FIG. 16 illustrates the directivity of outgoing light with the prism plate illustrated in FIG. 15 being viewed from above.

FIG. 18 illustrates a relationship between outgoing light and the light incident on the prism plate illustrated in FIG. 17.

FIG. 22 is a perspective view of a prism plate included in an illumination optical system in accordance with embodiment 2.

FIG. 24 illustrates a relationship on a cross section taken on line DD' in FIG. 23 between outgoing light and the light incident onto the prism plate illustrated in FIG. 22.

FIG. 25 illustrates the directivity of outgoing light with the prism plate illustrated in FIG. 22 being viewed from above.

FIG. 27 illustrates a relationship on a cross section taken on line EE' in FIG. 26 between outgoing light and the light incident onto the prism plate illustrated in FIG. 26.

FIG. 29 illustrates a configuration of an image pickup apparatus in accordance with embodiment 3.

FIG. 31 is a plan view of the prism plate illustrated in FIG. 30.

FIG. 32 is an enlarged plan view of the portion of the prism plate illustrated in FIG. 31 that is indicated by the dashed line.

FIG. 33B illustrates the directivity of emitted light under a condition in which a flat portion occupies a low proportion of a prism surface of the prism plate illustrated in FIG. 30.

FIG. 34 illustrates a relationship between an illuminance evaluation plane and an outgoing surface of an illumination optical system.

FIG. 35A illustrates an illuminance distribution on an evaluation plane under a condition in which illumination light emitted from an illumination optical system indicates the directivity illustrated in FIG. 33A.

FIG. 35B illustrates an illuminance distribution on an evaluation plane under a condition in which illumination light emitted from an illumination optical system indicates the directivity illustrated in FIG. 33B.

FIG. 39 is a perspective view of another variation of the prism plate included in the illumination optical system illustrated in FIG. 29.

FIG. 41 illustrates a configuration of a variation of the illumination optical system included in the image pickup apparatus illustrated in FIG. 29.

DESCRIPTION OF THE EMBODIMENTS

Figure 2:
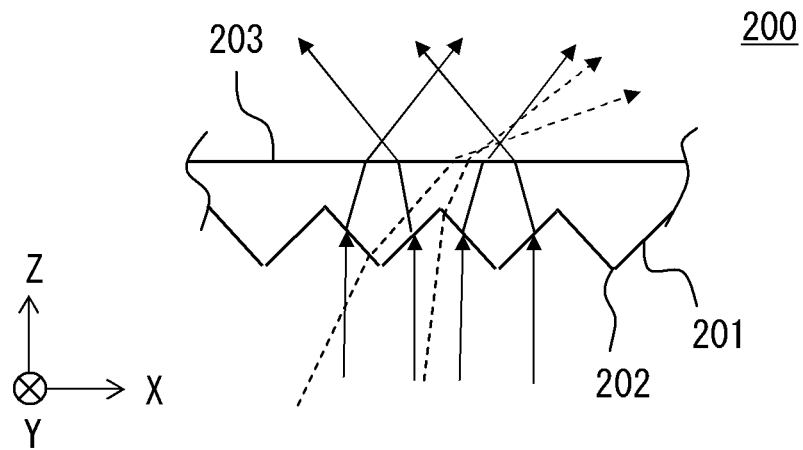
FIG. 2 illustrates a relationship on an XZ cross-section of a prism plate in accordance with a prior art between incident light and outgoing light.
Figure 3:
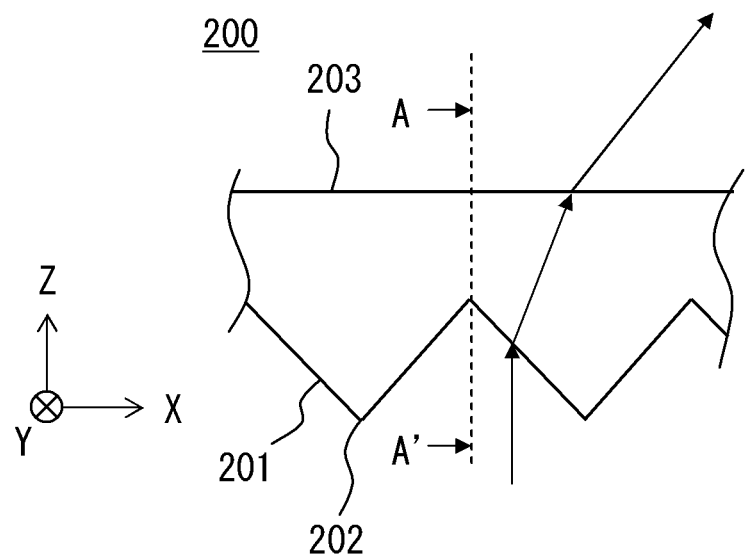
FIG. 3 illustrates a relationship on an XZ cross-section of the prism plate illustrated in FIG. 2 between outgoing light and the light incident perpendicularly onto the prism plate.
Figure 4:
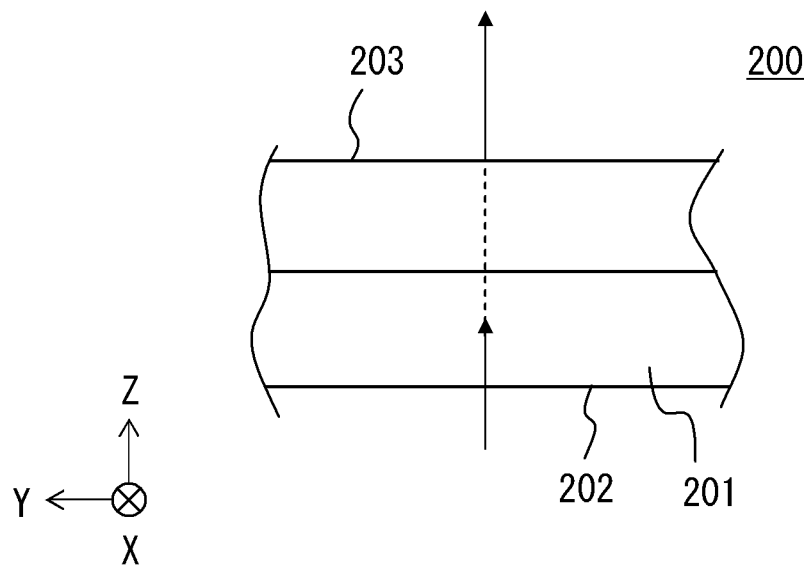
FIG. 4 illustrates a relationship on a YZ cross-section taken on line AA' in FIG. 3 between outgoing light and the light incident perpendicularly onto the prism plate illustrated in FIG. 2.

The prism plate 200 illustrated in FIG. 2 cannot emit outgoing light in a Y direction that is parallel to the ridge line 202 (hereinafter referred to as a "ridge-line direction"). In particular, as illustrated in FIG. 3 and FIG. 4, the light perpendicularly incident on the prism plate 200 (to be exact, incident light that does not have a Y-direction component; see the solid lines in FIG. 2) is deflected only in an X direction that is orthogonal to the ridge line 202. Thus, the outgoing light is not emitted in the ridge-line direction that is parallel to the ridge line 202. Similarly, the light obliquely incident on the prism plate 200 (to be exact, incident light that has a Y-direction component; see the dashed lines in FIG. 2) is deflected by the prism surface 201 in an X direction. Thus, as illustrated in FIG. 5, outgoing light has a Y-direction component in accordance with the Y-direction component of incident light but is not emitted in the ridge-line direction that is parallel to the ridge line 202.

As described above, technologies that use a conventional prism plate such as those disclosed by cited document 1 do not allow light to be emitted in the ridge-line direction, so the directivity of light cannot be arbitrarily controlled.

Figure 6:
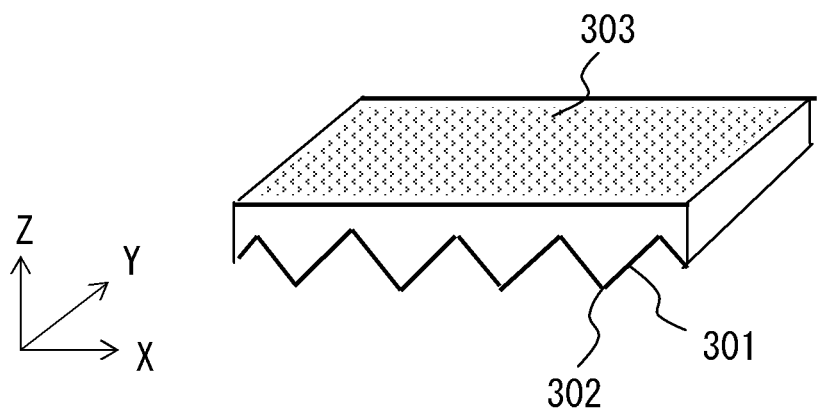
FIG. 6 illustrates a prism plate in accordance with a prior art that includes an outgoing surface formed as a blasted surface.
Figure 8:
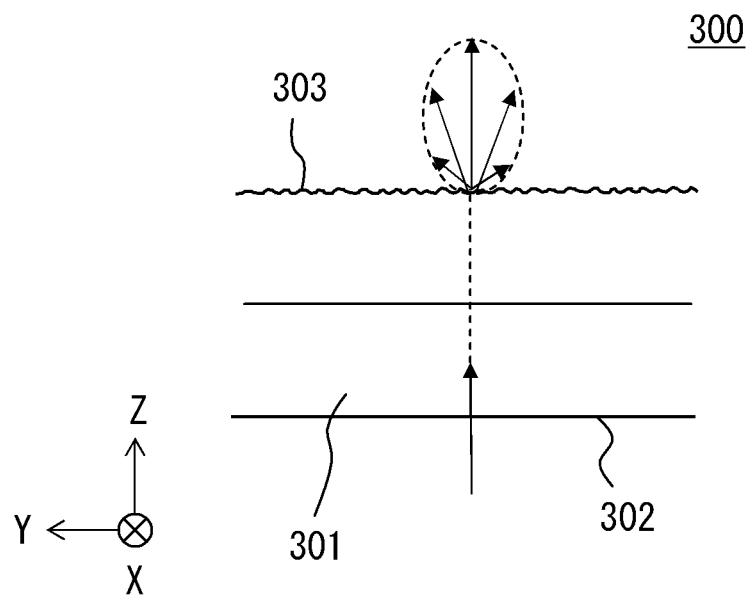
FIG. 8 illustrates a relationship on an XY cross-section taken online BB' in FIG. 7 between outgoing light and the light incident perpendicularly onto the prism plate illustrated in FIG. 6.

To improve the control, a method may possibly be used wherein blasting is applied to the outgoing surface of a prism plate so as to diffuse outgoing light. FIG. 6 illustrates a prism plate that includes an outgoing surface formed as a blasted surface. FIG. 7, FIG. 8, and FIG. 9 illustrate controlling the direction in which outgoing light is emitted by the prism plate illustrated in FIG. 6. FIG. 7 illustrates a relationship between outgoing light and incident light that enters the prism plate perpendicularly on an XZ cross-section of the prism plate illustrated in FIG. 6. FIG. 8 illustrates a relationship on a YZ cross-section taken on line BB' in FIG. 7 between outgoing light and the light incident perpendicularly onto the prism plate. FIG. 9 illustrates the directivity of outgoing light with the prism plate illustrated in FIG. 6 being viewed from above. The XYZ coordinate systems of FIG. 6 to FIG. 9 are right-handed orthogonal coordinate systems provided for the convenience of reference to directions.

A prism plate 300 illustrated in FIG. 6 includes: a prism surface 301 as an incidence surface on which a plurality of parallel prism columns having a ridge line 302 are arranged in the X direction; and a blasted surface 303 as an outgoing surface. With reference to the prism plate 300, as illustrated in FIG. 7 and FIG. 8, incident light deflected in the X direction by the prism surface 301 is diffused by the blasted surface 303, so outgoing light is also emitted in the ridge-line direction that is parallel to the ridge line 302.

However, the light incident on the blasted surface 303 has a strong X-direction directivity due to deflection by the prism surface 301. Thus, as illustrated in FIG. 9, the distribution of the amount of outgoing light emitted from the blasted surface 303 in various directions (hereinafter referred to as a "directivity distribution") is shaped like an ellipse having a short axis extending in the ridge-line direction (the Y direction), thereby disadvantageously maintaining a strong X-direction directivity even after diffusion by the blasted surface 303.

Accordingly, the prism plate 300 having the blasted surface 303 as an outgoing surface can control light directivities only in a limited way, so the light directivities cannot be arbitrarily controlled. Thus, the application to an illumination optical system of an image pickup apparatus does not allow the directivity of illumination light to be controlled arbitrarily in conformity with the image pickup apparatus.

In view of such a fact, an object of the present invention is to provide an illumination optical system for an image pickup apparatus, the illumination optical system being capable of arbitrarily controlling the directivity of illumination light.

Embodiment 1

Figure 10:
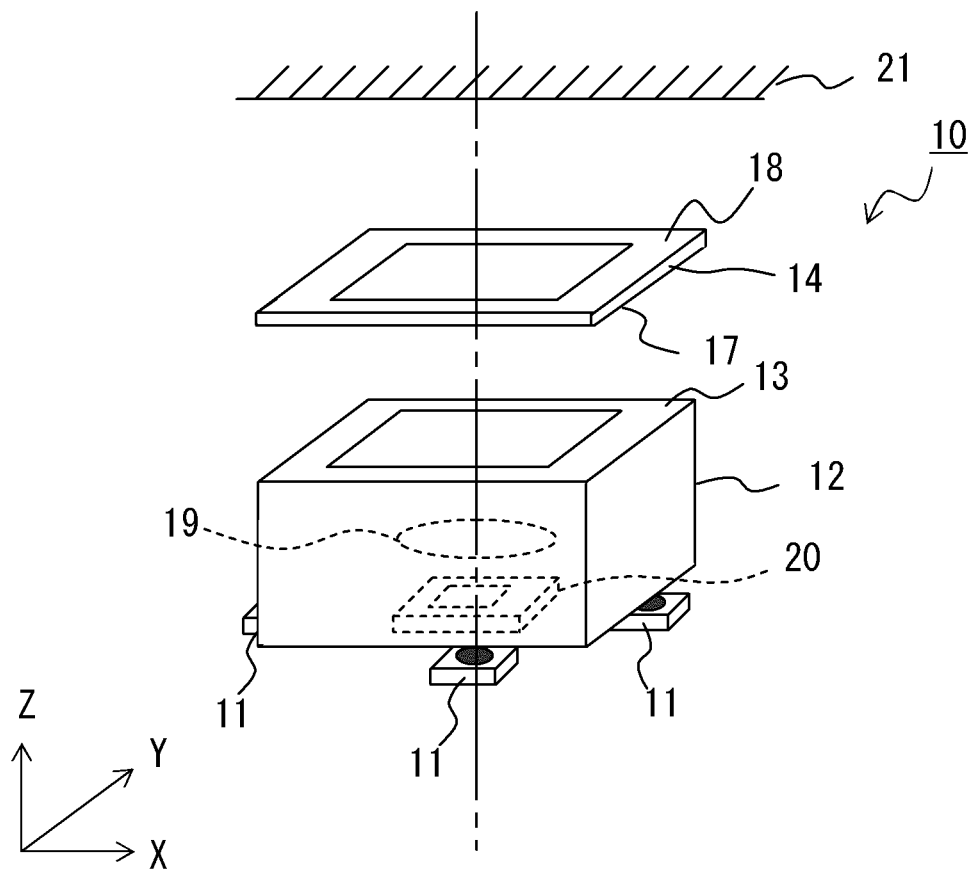
FIG. 10 illustrates a configuration of an image pickup apparatus in accordance with embodiment 1.
Figure 11:
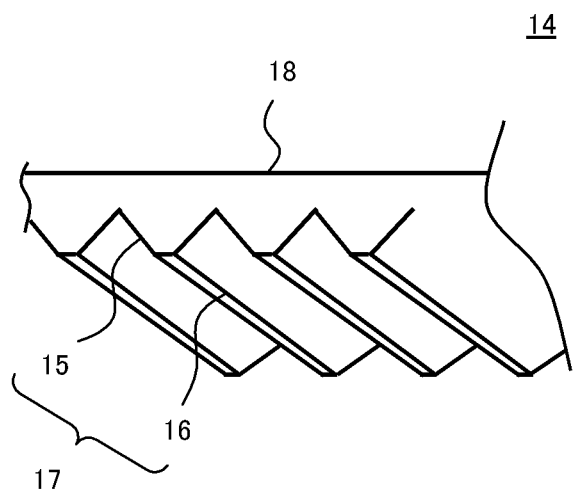
FIG. 11 is a perspective view of a prism plate included in an illumination optical system illustrated in FIG. 10.

FIG. 10 illustrates a configuration of an image pickup apparatus in accordance with the present embodiment. FIG. 11 is a perspective view of a prism plate included in an illumination optical system illustrated in FIG. 10 in accordance with the present embodiment. FIG. 12 is a plan view of the prism plate included in the illumination optical system illustrated in FIG. 10 in accordance with the present embodiment.

An image pickup apparatus 10 illustrated in FIG. 10 is an image pickup apparatus designed to read information from an object 21, e.g., a palm-vein authentication apparatus or a barcode reader. The image pickup apparatus 10 includes: an image-pickup optical system that includes an image-pickup lens 19 and an image sensor 20; and an illumination optical system surrounding the image-pickup optical system.

The illumination optical system includes: a plurality of LEDs 11 surrounding the image sensor 20 and arranged in a rectangular loop pattern; a prism plate 14 shaped like a rectangular loop; and a light guide 12 located between the plurality of LEDs 11 and the prism plate 14 and shaped like a rectangular tube surrounding the image-pickup lens 19. The prism plate 14 includes a prism surface 17 on a side facing the light guide 12, and, on a side facing the object 21, an outgoing surface 18 that is a plane parallel to an XY plane.

As illustrated in FIG. 11 and FIG. 12, a plurality of prism columns are formed on the prism surface 17 and are arranged in a side direction of the rectangular-loop-shaped prism plate 14. The direction in which the prism columns of the rectangular-loop-shaped prism plate 14 are arranged (corresponding to an X direction in FIG. 11) will hereinafter be referred to as a "line-up direction"; the direction in which the prism columns extend will hereinafter be referred to as a "ridge-line direction" (corresponding to a Y direction in FIG. 11).

As illustrated in FIG. 11, the prism surface 17 includes: inclined portions 15 that correspond to the slopes of a peak formed by each of the plurality of prism columns and that are inclined with respect to the line-up direction; flat portions 16 that correspond to the flat top of the peaks and that are parallel to the line-up direction. That is, when viewed from a cross section orthogonal to the ridge-line direction of the prism columns, each prism column assumes a trapezoidal shape, and the flat portion 16 is provided on each prism column.

In the illumination optical system illustrated in FIG. 10, illumination light that is emitted from the LEDs 11 and that enters the light guide 12 advances within the light guide 12 while repeating total reflection, thereby equalizing the directivities of the illumination light, and the illumination light is then emitted from an outgoing surface 13 toward the prism surface 17 of the prism plate 14. Subsequently, the prism plate 14 controls the directivity of the illumination light that enters the prism plate 14 from the prism surface 17, and the illumination light is then emitted from the outgoing surface 18 of the prism plate 14. Accordingly, the object 21 is irradiated with illumination light for which a directivity has been controlled.

Figure 14:
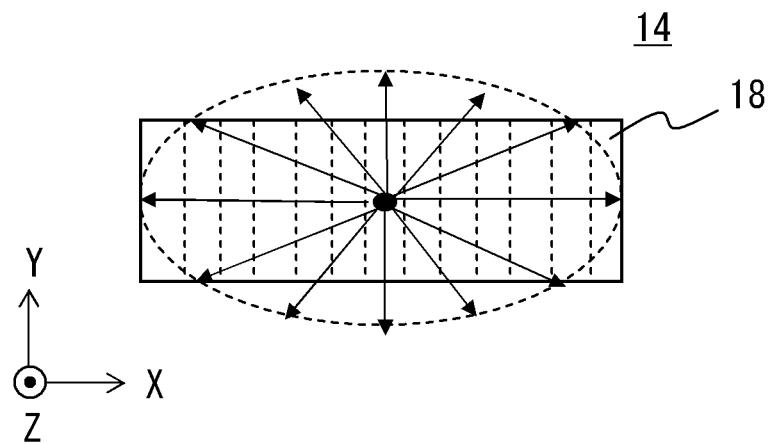
FIG. 14 illustrates the directivity of outgoing light with the prism plate illustrated in FIG. 10 being viewed from above.

Next, descriptions will be given of the fact that the illumination optical system in accordance with the present embodiment allows the directivity of illumination light to be arbitrarily controlled. FIG. 13 illustrates a relationship on a cross section taken on line CC' in FIG. 12 between outgoing light and the light incident onto the prism plate illustrated in FIG. 10. FIG. 14 illustrates the directivity of outgoing light with the prism plate illustrated in FIG. 10 being viewed from above.

As illustrated in FIG. 13, with reference to the prism plate 14 of the illumination optical system in accordance with the present embodiment, illumination light that enters at the inclined portion 15 of the prism surface 17 is deflected in the line-up direction (the X direction) due to refraction by the prism surface 17, while illumination light that enters at the flat portion 16 of the prism surface 17 passes through the prism plate 14 without being deflected in the line-up direction due to refraction by the prism surface 17. In addition, even when illumination light that enters at the flat portion 16 passes through the flat portion 16 and the outgoing surface 18, the ratio between a line-up-direction (X-direction) component and a ridge-line-direction (Y-direction) component of the illumination light that enters at the flat portion 16 is maintained since the flat portion 16 and the outgoing surface 18 are parallel to each other.

Accordingly, the illumination optical system in accordance with the present embodiment allows the directivity of illumination light to be arbitrarily controlled.

More particularly, as illustrated by the directivity distribution illustrated in FIG. 14, the illumination optical system in accordance with the present embodiment also allows illumination light to be emitted in the ridge-line direction. Moreover, in comparison with the prism plate 200 in FIG. 2 that deflects all pieces of incident illumination light in the line-up direction, the prism plate 14 may limit the amount of illumination light deflected in the line-up direction. Accordingly, in comparison with illumination optical systems in accordance with the prior art, the illumination optical system in accordance with the present embodiment may limit deflection of the directivity of illumination light in the line-up direction.

In addition, the prism plate 14 allows the amount of illumination light deflected in the line-up direction to be arbitrarily adjusted in accordance with the proportion of an area occupied on the prism surface 17 by the flat portion 16. Thus, the illumination optical system in accordance with the present embodiment allows the proportion of the amount of illumination light emitted in the line-up direction to the amount of illumination light emitted in the ridge-line direction to be arbitrarily controlled. FIG. 15 illustrates a relationship between outgoing light and the light incident on a prism plate including a flat portion that occupies a higher proportion of a prism surface than the flat portion of the prism plate illustrated in FIG. 10 does. FIG. 16 illustrates the directivity of outgoing light with the prism plate illustrated in FIG. 15 being viewed from above. As illustrated in FIG. 15, the amount of illumination light deflected in the line-up direction may be decreased by increasing the proportion of the area occupied by a flat portion 16a within a prism surface 17a of a prism plate 14a so as to decrease the amount of illumination light incident on an inclined portion 15a. Thus, as illustrated in FIG. 16, a directivity distribution that is closer to a circle is achievable.

The flat portion 16 of the prism plate 14 is basically parallel to the line-up direction but does not necessarily need to be parallel to the ridge-line direction. Inclining the flat portion 16 with respect to the ridge-line direction allows a balance to be adjusted between the amount of light emitted in a positive ridge-line direction (Y+) and the amount of light emitted in a negative ridge-line direction (Y−). Accordingly, the illumination optical system in accordance with the present embodiment also allows a balance to be arbitrarily controlled between the amount of illumination light emitted in the positive ridge-line direction (Y+) and the amount of illumination light emitted in the negative ridge-line direction (Y−). Such an adjustment may be made in accordance with, for example, the distance from the outgoing surface 18 to the object 21. As with the flat portion 16, the outgoing surface 18 is basically parallel to the line-up direction but does not necessarily need to be parallel to the ridge-line direction. Inclining the outgoing surface 18 with respect to the ridge-line direction may also achieve an advantageous effect similar to the advantageous effect achieved by inclining the flat portion 16 with respect to the ridge-line direction.

The descriptions above have been given with reference to an exemplary situation in which the directivities of illumination light emitted from the light guide 12 are equalized, but the directivities of illumination light emitted from the light guide 12 do not necessarily need to be equalized. The prism plate 14 may arbitrarily control the directivity of emitted light relative to the directivity of incident light. Accordingly, designing the prism plate 14 in accordance with the directivity of illumination light emitted from the light guide 12 allows the illumination optical system in accordance with the present embodiment to arbitrarily control the directivity of illumination light.

The flat portion 16 and the outgoing surface 18 are desirably parallel to the line-up direction but do not necessarily need to be completely parallel to the line-up direction. The flat portion 16 and the outgoing surface 18 may be inclined with respect to the line-up direction, as long as they form a smaller angle of inclination than the inclined portion 15 does and as long as the angle of inclination is within a range such that a function is obtained to distribute a light amount in the ridge-line direction.

In addition, the illumination optical system in accordance with the present embodiment allows a desired directivity to be easily achieved at a low cost.

It is typically difficult to quantify the performance of a blasted surface, and, in general, designing of a blasted surface inevitably depends on designating of a blast intensity. As a method for determining a designed value of a blast intensity, a method may possibly be adopted that uses a trial-manufacture experiment wherein blasting is applied at different blast intensities to materials similar to the material for an actual prism plate, e.g., plastic materials, and then these materials are compared with each other. However, applying blasting to a prism-plate mold at a blast intensity determined using such a method does not lead to an expectation that a prism plate formed by the mold will have a performance similar to the performance of the material used in the trial-manufacture experiment. This is because conditions such as hardness are completely different between the material used in the trial-manufacture experiment and the material for the mold. Thus, in order to determine a blast intensity that achieves a desired performance, it is necessary to apply blasting to molds themselves at different blast intensities and to compare these molds with each other, thereby causing a great burden in terms of both time and cost. By contrast, unlike the prism plate 300 in accordance with the prior art illustrated in FIG. 6, the prism plate 14 does not include a blasted surface. Accordingly, the illumination optical system in accordance with the present embodiment that includes the prism plate 14 allows a desired directivity to be easily achieved at a low cost. Moreover, without relying on an indirect index such as a blast intensity, the prism plate may be designed by designating the shape of the prism plate 14 in accordance with, for example, the width and the angle of the inclined portion 15 and the flat portion 16. Thus, the design may be represented on a drawing, and, as a result, designed performances may be achieved with a high reproducibility.

In addition, the illumination optical system in accordance with the present embodiment may downsize the entirety of the image pickup apparatus.

The illumination optical system in accordance with the prior art cannot emit illumination light in the ridge-line direction, so making the illumination optical system loop-shaped to surround an image pickup optical system disables illumination light emitted from a light source from being effectively utilized. By contrast, the illumination optical system in accordance with the present embodiment may emit illumination light in the ridge-line direction so that the directivity of illumination light can be arbitrarily controlled. Thus, as illustrated in FIG. 10, the illumination optical system may be shaped like a rectangular loop in such a manner that the image pickup optical system is located inside the rectangular loop, and hence the illumination optical system in accordance with the present embodiment may downsize the entirety of the image pickup apparatus while maintaining the efficiency for utilization of illumination light.

In the following, descriptions will be given of various variations of the prism plate included in the illumination optical system in accordance with the present embodiment.

Figure 17:
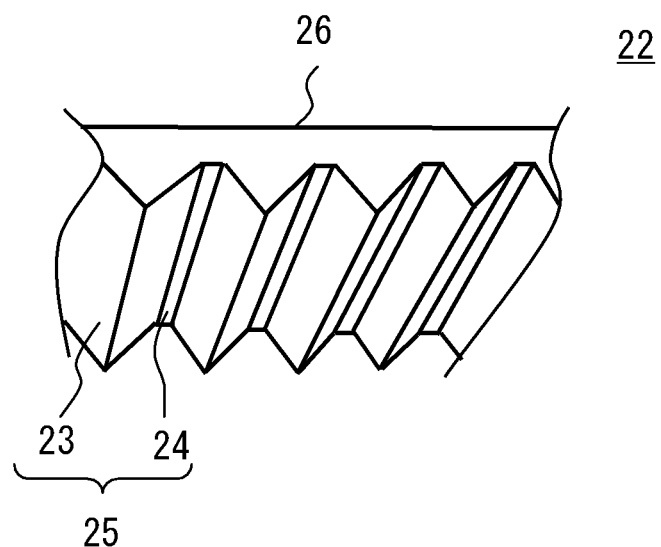
FIG. 17 is a perspective view of a variation of the prism plate included in the illumination optical system illustrated in FIG. 10.
Figure 19:
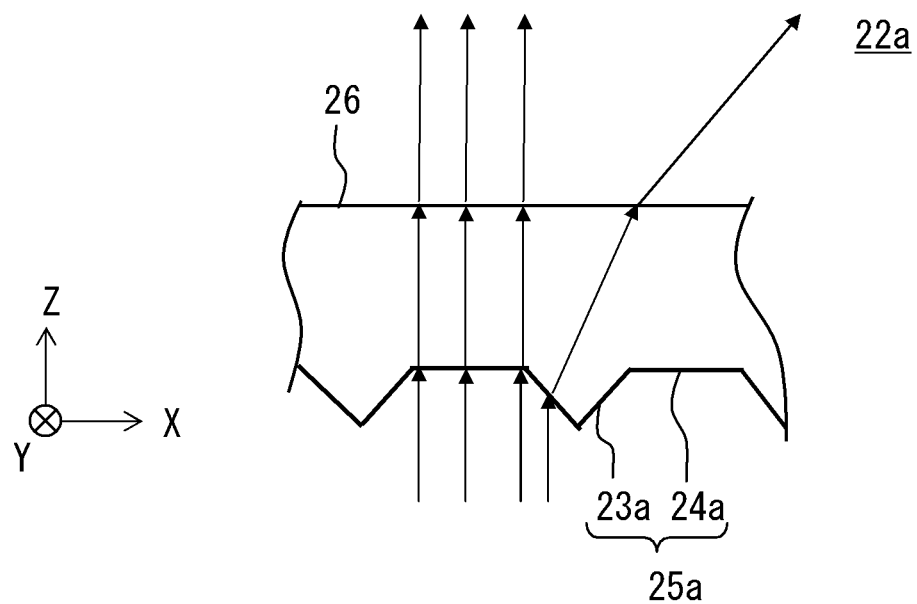
FIG. 19 illustrates a relationship between outgoing light and the light incident on a prism plate including a flat portion that occupies a higher proportion of a prism surface than the flat portion of the prism plate illustrated in FIG. 17 does.
Figure 20:
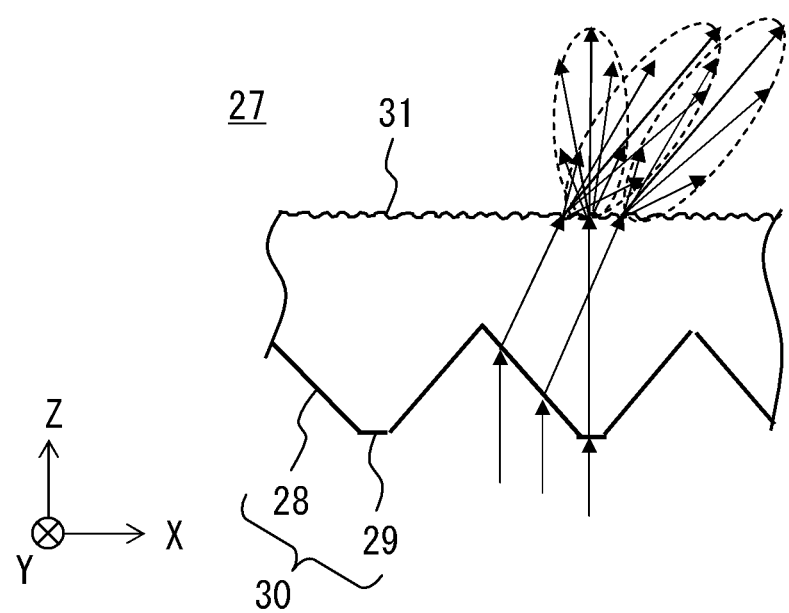
FIG. 20 illustrates a relationship between outgoing light and the light incident on another variation of the prism plate included in the illumination optical system illustrated in FIG. 10.
Figure 21:
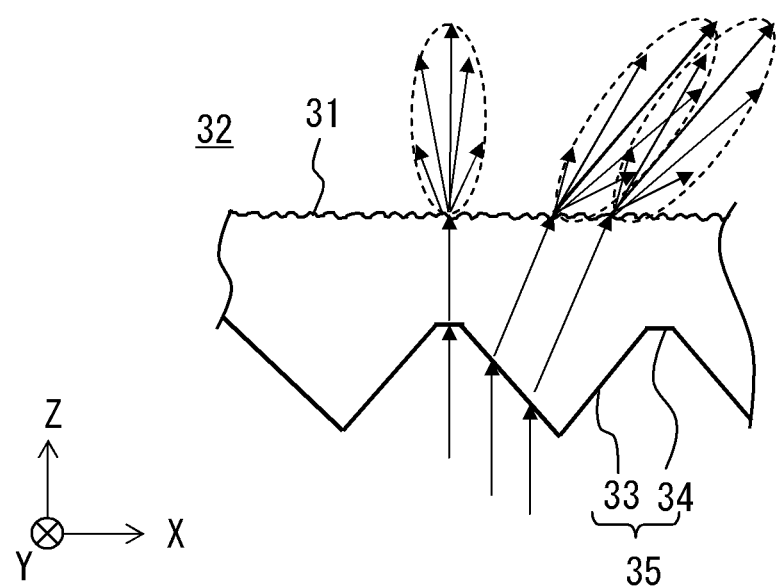
FIG. 21 illustrates a relationship between outgoing light and the light incident on a still another variation of the prism plate included in the illumination optical system illustrated in FIG. 10.

FIG. 17 is a perspective view of a variation of the prism plate included in the illumination optical system illustrated in FIG. 10. FIG. 18 illustrates a relationship between outgoing light and the light incident on the prism plate illustrated in FIG. 17. FIG. 19 illustrates a relationship between outgoing light and the light incident on a prism plate including a flat portion that occupies a higher proportion of a prism surface than the flat portion of the prism plate illustrated in FIG. 17 does. FIG. 20 illustrates a relationship between outgoing light and the light incident on another variation of the prism plate included in the illumination optical system illustrated in FIG. 10. FIG. 21 illustrates a relationship between outgoing light and the light incident on still another variation of the prism plate included in the illumination optical system illustrated in FIG. 10.

A prism plate 22 illustrated in FIG. 17 is different from the prism plate 14 in the sense that a prism surface 25 on a side facing a light guide includes: inclined portions 23 that correspond to the slopes of a peak formed by each of the plurality of prism columns and that are inclined with respect to the line-up direction; and flat portions 24 that correspond to troughs formed between the plurality of prism columns and that are parallel to the line-up direction. That is, when the prism plate 22 is viewed from a cross section orthogonal to the ridge-line direction of the prism columns, each prism column assumes a triangular shape, and the flat portions 24 are provided between the plurality of prism columns. As with the prism plate 14, the prism plate 22 includes, on a side facing an object, an outgoing surface (an outgoing surface 26) that is a plane parallel to the XY plane.

As illustrated in FIG. 18, with reference to the prism plate 22, illumination light that enters at the inclined portion 23 is deflected in the line-up direction (the X direction) due to refraction by the prism surface 25, while illumination light that enters at the flat portion 24 passes through the prism plate 22 without being deflected in the line-up direction due to refraction by the prism surface 25. Thus, the prism plate 22 may achieve an advantageous effect similar to the advantageous effect achieved by the prism plate 14.

In addition, as with the prism plate 14, the prism plate 22 allows the amount of illumination light deflected in the line-up direction to be arbitrarily adjusted in accordance with the proportion of an area occupied on the prism surface 25 by the flat portion 24. For example, as indicated by a prism plate 22a illustrated in FIG. 19, the amount of illumination light deflected in the line-up direction may be decreased by increasing the proportion of the area occupied by a flat portion 24a within a prism surface 25a of a prism plate 22a so as to decrease the amount of illumination light incident on an inclined portion 23a.

A prism plate 27 illustrated in FIG. 20 is different from the prism plate 14 in the sense that the prism plate 27 includes, on a side facing an object, an outgoing surface 31 that is a blasted surface (a diffusing surface) including minute asperities. As with the prism plate 14, a prism surface (a prism surface 30) formed on a side facing a light guide includes: an inclined portion (an inclined portion 28) inclined with respect to the line-up direction; and a flat portion (a flat portion 29) that is parallel to the line-up direction.

As illustrated in FIG. 20, with reference to the prism plate 27, illumination light for which a directivity has been adjusted by the prism surface 30 is diffused by the outgoing surface 31. Thus, the prism plate 27 may weaken directivities more greatly than the prism plate 14 does. That is, a directivity distribution is achievable that is closer to a circle than a directivity distribution achieved by the prism plate 14 is. Prism plates such as the prism plate 27 are more advantageous when, for example, the directivity of illumination light emitted from the light guide 12 illustrated in FIG. 10 is deflected significantly.

Even in the case of a prism plate such as a prism plate 32 illustrated in FIG. 21, i.e., a prism plate including, on a side facing a light guide, a prism surface 35 including: an inclined portion 33 inclined with respect to the line-up direction; and a flat portion 34 that corresponds to a trough and that is parallel to the line-up direction, an advantageous effect similar to the advantageous effect achieved by the prism plate 27 is achievable as long as a blasted surface on which minute asperities are formed is provided on the side facing an object.

Embodiment 2

Figure 23:
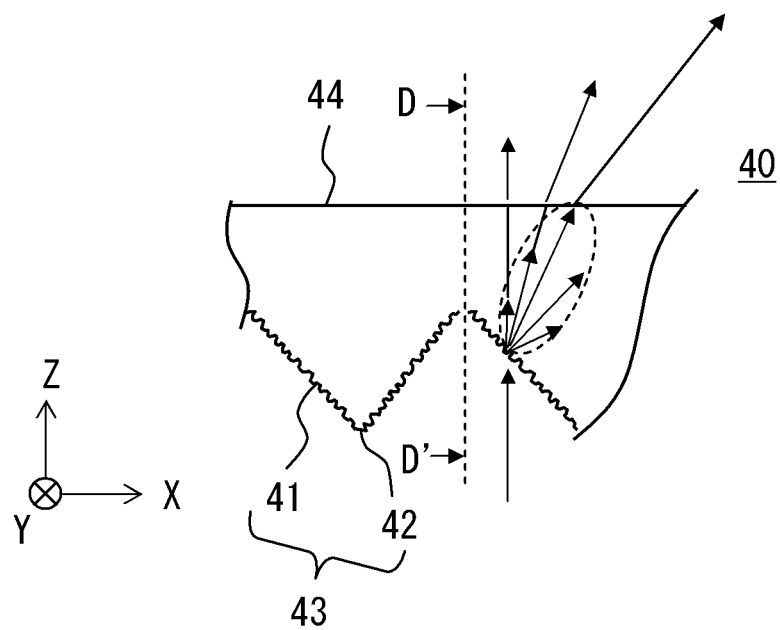
FIG. 23 illustrates a relationship between outgoing light and the light incident on the prism plate illustrated in FIG. 22.

FIG. 22 is a perspective view of a prism plate included in an illumination optical system in accordance with the present embodiment. FIG. 23 illustrates a relationship between outgoing light and the light incident on the prism plate illustrated in FIG. 22. FIG. 24 illustrates a relationship on a cross section taken on line DD' in FIG. 23 between outgoing light and the light incident onto the prism plate illustrated in FIG. 22. FIG. 25 illustrates the directivity of outgoing light with the prism plate illustrated in FIG. 22 being viewed from above. Note that, except for the fact that a prism plate 40 illustrated in FIG. 22 is provided in place of the prism plate 14, the illumination optical system in accordance with the present embodiment is similar to the illumination optical system in accordance with embodiment 1 illustrated in FIG. 10.

The prism plate 40 illustrated in FIG. 22 includes: a prism surface 43 which is provided on a side facing a light guide and on which a plurality of prism columns are formed; and an outgoing surface 44 which is provided on a side facing an object and which is a plane parallel to the XY plane. The prism surface 43 includes: inclined portions 41 that correspond to the slopes of a peak formed by each of the plurality of prism columns; and ridge lines 42 of the peaks, and each prism column assumes a triangular shape when viewed from a cross section orthogonal to the ridge-line direction of the prism columns. The inclined portions 41 are formed as a blasted surface (a diffusing surface) on which minute asperities are formed.

As illustrated in FIG. 23 and FIG. 24, with reference to the prism plate 40 of the illumination optical system in accordance with the present embodiment, refraction and diffusion simultaneously occur when illumination light enters at the inclined portion 41 inclined with respect to the line-up direction. That is, the prism plate 40 causes illumination light that has passed through the inclined portion 41 to be emitted in various directions, including the ridge-line direction, and deflects the center of the distribution of the amount of light (hereinafter referred to as an "optical axis") in the line-up direction. Thus, as illustrated in FIG. 25, the directivity distribution of illumination light emitted from the outgoing surface 44 is shaped like an ellipse, and illumination light is also emitted in the ridge-line direction. The blast intensity that is used to form the inclined portion 41 of the prism plate 40 as a blasted surface may be adjusted to adjust the amount of illumination light emitted in the ridge-line direction.

Accordingly, the illumination optical system in accordance with the present embodiment may arbitrarily control the directivity of illumination light. With reference to the prism plate 40, diffusion does not occur after deflection but occurs simultaneously with deflection so that diffusion caused by the blasted surface can be more efficient than in the case of the prism plate 300 illustrated in FIG. 5. Accordingly, in comparison with the illumination optical system that includes the prism plate 300, the illumination optical system in accordance with the present embodiment may broaden the range of directivity control, thereby achieving a directivity distribution that is closer to a circle.

In the following, descriptions will be given of a variation of the prism plate included in the illumination optical system in accordance with the present embodiment.

Figure 26:
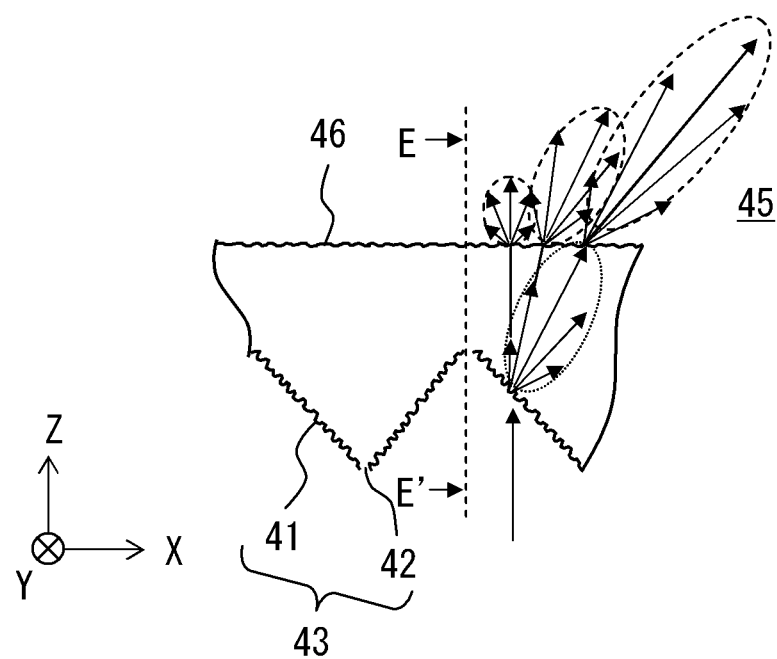
FIG. 26 illustrates a relationship between outgoing light and the light incident on a variation of the prism plate included in the illumination optical system in accordance with embodiment 2.
Figure 28:
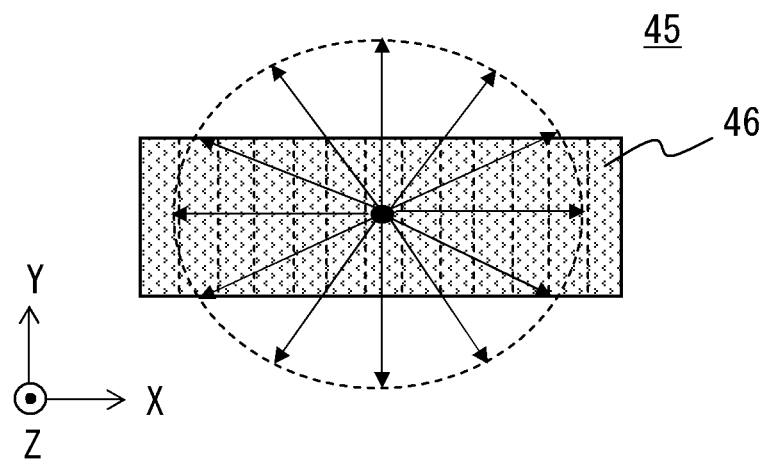
FIG. 28 illustrates the directivity of outgoing light with the prism plate illustrated in FIG. 26 being viewed from above.

FIG. 26 illustrates a relationship between outgoing light and the light incident on a variation of the prism plate included in the illumination optical system in accordance with the present embodiment. FIG. 27 illustrates a relationship on a cross section taken on line EE' in FIG. 26 between outgoing light and the light incident onto the prism plate illustrated in FIG. 26. FIG. 28 illustrates the directivity of outgoing light with the prism plate illustrated in FIG. 26 being viewed from above.

A prism plate 45 illustrated in FIG. 26 and FIG. 27 is different from the prism plate 40 in the sense that the prism plate 45 includes, on a side facing an object, an outgoing surface 46 that is a blasted surface (a diffusing surface) including minute asperities. As with the prism plate 40, the prism surface 43 includes, on the side facing the light guide, an inclined portion 41 formed as a blasted surface.

As illustrated in FIG. 26 and FIG. 27, with reference to the prism plate 45, not only the inclined portion 41 of the prism surface 43, i.e., an incidence surface, but also the outgoing surface 46 is formed as a blasted surface, so refraction and diffusion occur on both the inclined portion 41 and the outgoing surface 46. Accordingly, in comparison with the illumination optical system that includes the prism plate 40, the illumination optical system that includes the prism plate 45 may significantly broaden the range of directivity control, thereby achieving a directivity distribution that is closer to a circle as illustrated in FIG. 28.

Embodiment 3

Figure 30:
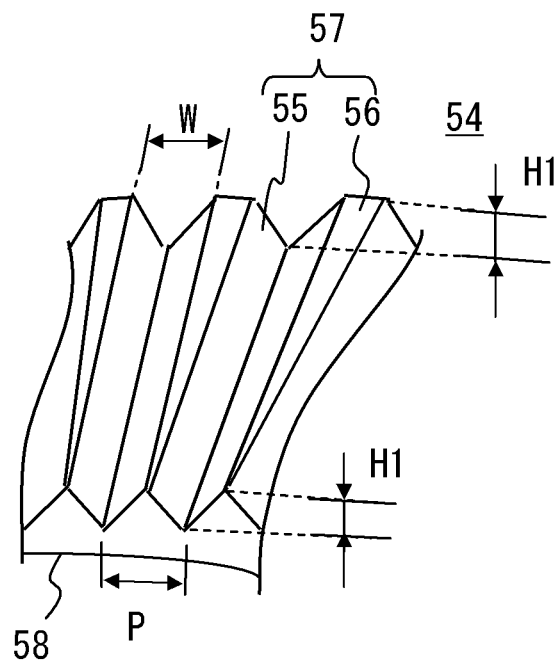
FIG. 30 is a perspective view of a prism plate included in an illumination optical system illustrated in FIG. 29.

FIG. 29 illustrates a configuration of an image pickup apparatus in accordance with the present embodiment. FIG. 30 is a perspective view of a prism plate included in an illumination optical system illustrated in FIG. 29. FIG. 31 is a plan view of the prism plate illustrated in FIG. 30. FIG. 32 is an enlarged plan view of the portion of the prism plate illustrated in FIG. 31 that is indicated by the dashed line.

An image pickup apparatus 50 illustrated in FIG. 29 is an image pickup apparatus designed to read information from an object 61, e.g., a palm-vein authentication apparatus or a barcode reader. The image pickup apparatus 50 includes: an image-pickup optical system that includes an image-pickup lens 59 and an image sensor 60; and an illumination optical system designed for the image pickup apparatus and surrounding the image-pickup optical system.

The illumination optical system includes: a plurality of LEDs 51 surrounding the image sensor 60 and arranged in a circular loop pattern; a prism plate 54 shaped like a circular loop; and a light guide 52 located between the plurality of LEDs 51 and the prism plate 54 and shaped like a circular tube surrounding the image-pickup lens 59. The prism plate 54 includes a prism surface 57 on a side facing the light guide 52, and, on a side facing the object 61, an outgoing surface 58 that is a plane orthogonal to an optical axis of the image pickup optical system. It is noted that the prism plate 54 is the same as the prism plate 14 of embodiment 1 except that it is shaped like a circular loop.

As illustrated in FIG. 30 and FIG. 31, a plurality of prism columns are formed on the prism surface 57. The plurality of prism columns are arranged in a circular loop pattern in the circumference direction of the circular-loop-shaped prism plate 54, and the prism columns are each extended in the radial direction of the circular-loop-shaped prism plate 54.

The prism surface 57 includes: inclined portions 55 that correspond to the slopes of a peak formed by each of the plurality of prism columns and that are inclined with respect to the tangential direction of the prism plate 54; and flat portions 56 that correspond to the flat top of the peaks and that are parallel to the tangential direction of the prism plate 54. That is, when viewed from a cross section orthogonal to the radial direction of the prism plate 54, each prism column assumes a trapezoidal shape, and the flat portion 56 is provided on each prism column.

As illustrated in FIG. 30, the height of the peaks of the prism columns arranged in a circular loop pattern in the circumference direction is constant over the prism plate 54 (i.e., constant from the outer circumference to the internal circumference); in particular, the height of the peaks is H1 over the entirety of the prism plate 54. The intervals between the peaks are also constant; in particular, the intervals are interval W. As illustrated in FIG. 32, the outer circumference of the circular-loop-shaped prism plate 54 is understandably longer than the internal circumference, and hence, although the width of the inside of each prism column is width P, the width of each prism column becomes longer from the internal circumference of the prism plate 54 to the outer circumference. With reference to the prism plate 54, the increment between width P and the width of the prism columns that becomes longer from the internal circumference to the outer circumference is the width of the flat portion 56. Intervals between peaks W and width P of the prism column satisfy W=P.

In an illumination optical system configured as described above, illumination light that is emitted from the LEDs 51 and enters the light guide 52 advances within the light guide 52 while repeating total reflection, thereby equalizing the directivities of the illumination light, and the illumination light is then emitted from an outgoing surface 53 toward the prism surface 57 of the prism plate 54. Subsequently, the prism plate 54 controls the directivity of the illumination light that enters the prism plate 54 from the prism surface 57, and the illumination light is then emitted from the outgoing surface 58 of the prism plate 54. Accordingly, the object 61 is irradiated with illumination light for which a directivity has been controlled.

With reference to the prism plate 54, illumination light that enters at the inclined portion 55 of the prism surface 57 is deflected in the tangential direction due to refraction by the prism surface 57, while illumination light that enters at the flat portion 56 of the prism surface 57 passes through the prism plate 54 without being deflected in the tangential direction due to refraction by the prism surface 57. In addition, even when illumination light that enters at the flat portion 56 passes through the flat portion 56 and the outgoing surface 58, the ratio between a tangential-direction component and a radial-direction component of the illumination light is maintained since the flat portion 56 and the outgoing surface 58 are parallel to each other.

Accordingly, as with the illumination optical system in accordance with embodiment 1, the illumination optical system in accordance with the present embodiment allows the directivity of illumination light to be arbitrarily controlled. More particularly, the illumination optical system in accordance with the present embodiment also allows illumination light to be emitted in the radial direction, thereby limiting deflection of the directivity of illumination light in the tangential direction.

In addition, the illumination optical system in accordance with the present embodiment allows the amount of illumination light deflected in the tangential direction to be arbitrarily adjusted in accordance with the proportion of an area occupied on the prism surface 57 by the flat portion 56. Thus, as with the illumination optical system in accordance with embodiment 1, the illumination optical system in accordance with the present embodiment allows the proportion of the amount of illumination light emitted in the tangential direction to the amount of illumination light emitted in the radial direction to be arbitrarily controlled.

Figure 33A:
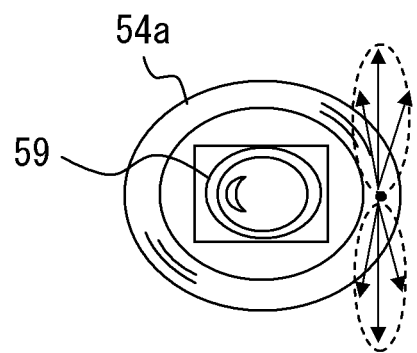
FIG. 33A illustrates the directivity of emitted light in the absence of a flat portion of the prism surface of the prism plate illustrated in FIG. 30.
Figure 33C:
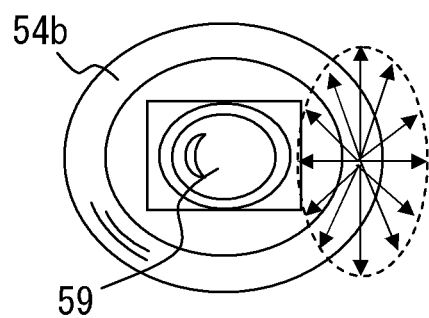
FIG. 33C illustrates the directivity of emitted light under a condition in which a flat portion occupies an intermediate proportion of the prism surface of the prism plate illustrated in FIG. 30.
Figure 33D:
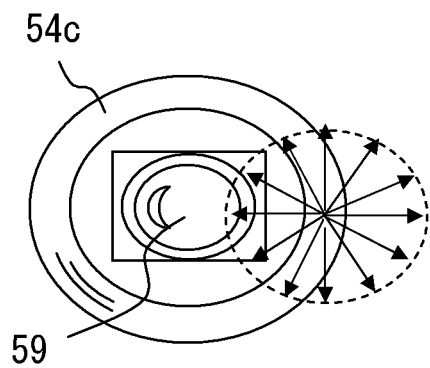
FIG. 33D illustrates the directivity of emitted light under a condition in which a flat portion occupies a high proportion of the prism surface of the prism plate illustrated in FIG. 30.

FIG. 33A illustrates the directivity of emitted light in the absence of a flat portion of the prism surface of the prism plate illustrated in FIG. 30. FIG. 33B illustrates the directivity of emitted light under a condition in which a flat portion occupies a low proportion of a prism surface of the prism plate illustrated in FIG. 30. FIG. 33C illustrates the directivity of emitted light under a condition in which a flat portion occupies an intermediate proportion of the prism surface of the prism plate illustrated in FIG. 30. FIG. 33D illustrates the directivity of emitted light under a condition in which a flat portion occupies a high proportion of the prism surface of the prism plate illustrated in FIG. 30.

In the case of an illumination optical system that employs, in place of the prism plate 54, a prism plate 54*a* that does not include a flat portion on the prism surface, illumination light is not emitted in the radial direction even when incident light from various directions enters the prism plate 54*a*, and hence illumination light emitted from the illumination optical system is distributed in a figure eight pattern, with a portion narrowed in the radial direction, as illustrated in FIG. 33A.

In the case of an illumination optical system that employs a prism plate 54 wherein a flat portion occupies a low proportion of a prism surface, a relatively small amount of illumination light is emitted in the radial direction. Thus, as illustrated in FIG. 33B, illumination light emitted from the illumination optical system has an ellipse-shaped directivity distribution that indicates a strong tangential-direction directivity in comparison with a radial-direction directivity.

In the case of an illumination optical system that employs, in place of the prism plate 54, a prism plate 54*b* wherein a flat portion occupies an intermediate proportion of a prism surface, a certain amount of illumination light is also emitted in the radial direction. Thus, as illustrated in FIG. 33C, illumination light emitted from the illumination optical system has a directivity distribution that indicates a strong tangential-direction directivity relative to a radial-direction directivity but has an ellipsoid shape that is relatively close to a circle.

In the case of an illumination optical system that employs, in place of the prism plate 54, a prism plate 54*c* wherein a flat portion occupies a high proportion of a prism surface, a sufficient amount of illumination light is also emitted in the radial direction. Thus, as illustrated in FIG. 33D, illumination light emitted from the illumination optical system has a directivity distribution substantially shaped like a cycle.

Next, descriptions will be given of an illuminance distribution on the object 61 under a condition in which the object 61 is irradiated with illumination light having the directivity distributions illustrated in FIG. 33A to FIG. 33D.

Figure 35C:
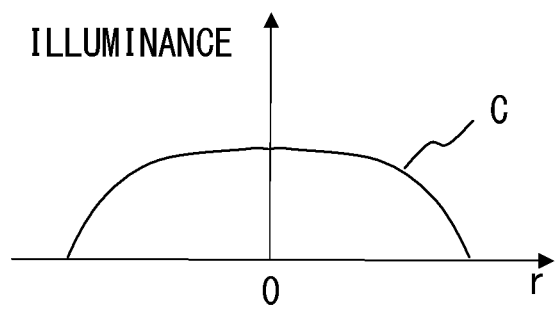
FIG. 35C illustrates an illuminance distribution on an evaluation plane under a condition in which illumination light emitted from an illumination optical system indicates the directivity illustrated in FIG. 33C.
Figure 35D:
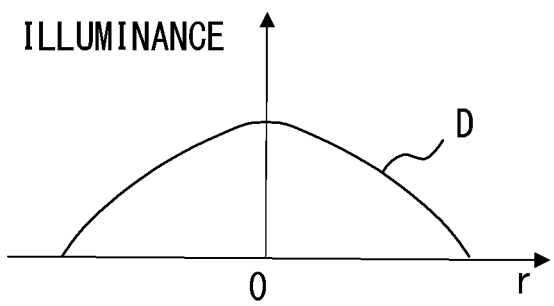
FIG. 35D illustrates an illuminance distribution on an evaluation plane under a condition in which illumination light emitted from an illumination optical system indicates the directivity illustrated in FIG. 33D.
Figure 36:
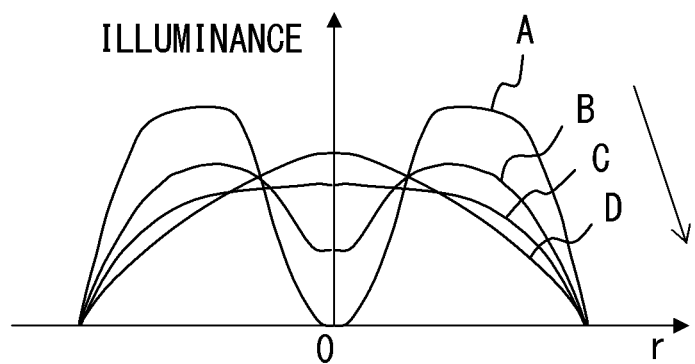
FIG. 36 illustrates a change in an illuminance distribution that is made on an evaluation plane by a change in the directivity of illumination light emitted from an illumination optical system.

FIG. 34 illustrates a relationship between an illuminance evaluation plane and an outgoing surface of an illumination optical system. FIG. 35A illustrates an illuminance distribution on an evaluation plane under a condition in which illumination light emitted from an illumination optical system indicates the directivity illustrated in FIG. 33A. FIG. 35B illustrates an illuminance distribution on an evaluation plane under a condition in which illumination light emitted from an illumination optical system indicates the directivity illustrated in FIG. 33B. FIG. 35C illustrates an illuminance distribution on an evaluation plane under a condition in which illumination light emitted from an illumination optical system indicates the directivity illustrated in FIG. 33C. FIG. 35D illustrates an illuminance distribution on an evaluation plane under a condition in which illumination light emitted from an illumination optical system indicates the directivity illustrated in FIG. 33D. FIG. 36 illustrates a change in an illuminance distribution that is made on an evaluation plane by a change in the directivity of illumination light emitted from an illumination optical system.

As illustrated in FIG. 34, an optical-axis direction of the image pickup optical system is defined as a z-axis direction, z coordinates of the outgoing surface 58 of the illumination optical system are defined as 0, and z coordinates of the evaluation plane that correspond to the surface of the object 61 are defined as z1. In addition, a radial direction that is orthogonal to the optical-axis direction of the image pickup optical system is defined as an r direction, and r coordinates of the optical axis of the image pickup optical system are defined as 0.

When illumination light that has the directivity distribution illustrated in FIG. 33A enters the evaluation plane, the illuminance of a central portion of the evaluation plane is 0, as illustrated in FIG. 35A. Thus, for the directivity distribution illustrated in FIG. 33A, a central portion of the object 61 is not illuminated at all.

Meanwhile, when illumination light that is also distributed in the radial direction as illustrated in FIG. 33B to FIG. 33D enters the evaluation plane, illuminance is also generated in a central portion of the evaluation plane as illustrated in FIG. 35B to FIG. 35D so that the entirety of the object 61 can be illuminated.

When illumination light that has a directivity distribution substantially shaped like a cycle illustrated in FIG. 33D enters the evaluation plane, an illuminance distribution D does not become flat and a central portion of the evaluation plane indicates a high illuminance, as illustrated in FIG. 35D. This is because the illumination optical system is shaped like a circular loop. When illumination light illustrated in FIG. 33C having a directivity distribution shaped like an ellipse that is relatively close to a circle and that has a short axis extending in the radial direction enters the evaluation plane, a substantially planar illumination distribution C is generated on the evaluation plane, as illustrated in FIG. 35C.

As described above, the illumination optical system in accordance with the present embodiment allows the proportion of the area occupied on the prism surface by the flat portion to be changed so as to change the amount of illumination light emitted in the radial direction, so that the directivity distribution of the illumination light can be controlled, with the result that the illumination distribution on the evaluation plane (the object) can be arbitrarily controlled as illustrated in FIG. 36.

The flat portion 56 of the prism plate 54 is basically parallel to the tangential direction but does not necessarily need to be parallel to the radial direction. Inclining the flat portion 56 with respect to the radial direction allows a balance to be adjusted between the amount of light emitted in a positive radial direction (a direction from the internal circumference to the outer circumference of the prism plate 54) and the amount of light emitted in a negative radial direction (a direction from the outer circumference to the internal circumference of the prism plate 54). Accordingly, the illumination optical system in accordance with the present embodiment also allows a balance to be arbitrarily controlled between the amount of illumination light emitted in the positive radial direction and the amount of illumination light emitted in the negative radial direction. Such an adjustment may be made in accordance with, for example, the distance from the outgoing surface 58 to the object 61. As with the flat portion 56, the outgoing surface 58 is basically parallel to the tangential direction but does not necessarily need to be parallel to the radial direction. Inclining the outgoing surface 58 with respect to the radial direction may also achieve an advantageous effect similar to the advantageous effect achieved by inclining the flat portion 56 with respect to the radial direction.

The present embodiment has been described with reference to an exemplary situation in which the directivities of illumination light emitted from the outgoing surface 58 are equalized, but the directivities of illumination light emitted from the light guide 52 do not necessarily need to be equalized. The prism plate 54 may arbitrarily control the directivity of emitted light relative to the directivity of incident light. Accordingly, designing the prism plate 54 in accordance with the directivity of illumination light emitted from the light guide 52 allows the illumination optical system in accordance with the present embodiment to arbitrarily control the directivity of illumination light.

The flat portion 56 and the outgoing surface 58 are desirably parallel to the tangential direction but do not necessarily need to be completely parallel to the tangential direction. The flat portion 56 and the outgoing surface 58 may be inclined with respect to the tangential direction, as long as they form a smaller angle of inclination than the inclined portion 55 does and as long as the angle of inclination is within a range such that a function is obtained to distribute a light amount in the radial direction.

In addition, the illumination optical system in accordance with the present embodiment does not include a blasted surface, so, for a reason similar to the reason described with reference to embodiment 1, the illumination optical system in accordance with the present embodiment allows a desired directivity to be easily achieved at a low cost. Moreover, the design may be represented on a drawing, and, as a result, designed performances may be achieved with high reproducibility.

In addition, the illumination optical system in accordance with the present embodiment may downsize the entirety of the image pickup apparatus. The illumination optical system in accordance with the prior art cannot emit illumination light in the ridge-line direction (corresponding to the radius direction for the illumination optical system in accordance with the present embodiment), so making the illumination optical system loop-shaped to surround an image pickup optical system disables illumination light emitted from a light source from being effectively utilized. By contrast, the illumination optical system in accordance with the present embodiment may emit illumination light in the radius direction so that the directivity of illumination light can be arbitrarily controlled. Thus, as illustrated in FIG. 29, the illumination optical system may be shaped like a circular loop in such a manner that the image pickup optical system is located inside the circular loop, and hence the illumination optical system in accordance with the present embodiment may downsize the entirety of the image pickup apparatus while maintaining the efficiency of utilization of illumination light.

In the case of an illumination optical system shaped like a rectangular loop, for example, the distance from a central portion of each side of the rectangle to the image-pickup lens 59 is different from the distance from an end of each side of the rectangle to the image-pickup lens 59, and the relationship between the image-pickup lens 59 and the optical axis of illumination light emitted from the central portion of each side is different from the relationship between the image-pickup lens 59 and the optical axis of illumination light emitted from the end of each side, so the illumination light emitted from the central portion of each side and the illumination light emitted from the end of each side have different influences on picking up an image. By contrast, in the case of an illumination optical system shaped like a circular loop, even pieces of illumination light emitted from different positions arranged in the circumference direction do not affect the picking up of an image differently, so the illumination optical system may easily achieve an optimum condition for picking up an image by controlling the directivity of illumination light. Accordingly, the illumination optical system in accordance with the present embodiment is more suitable as an illumination optical system of an image pickup optical system.

In the following, descriptions will be given of various variations of the prism plate included in the illumination optical system in accordance with the present embodiment.

Figure 37:
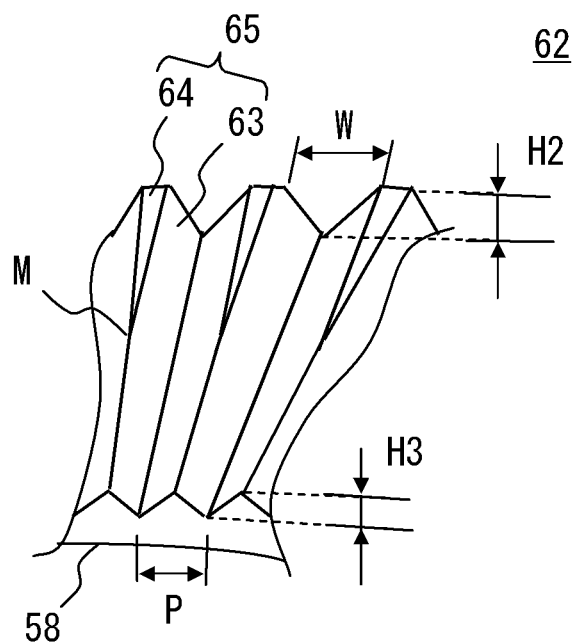
FIG. 37 is a perspective view of a variation of the prism plate included in the illumination optical system illustrated in FIG. 29.
Figure 38:
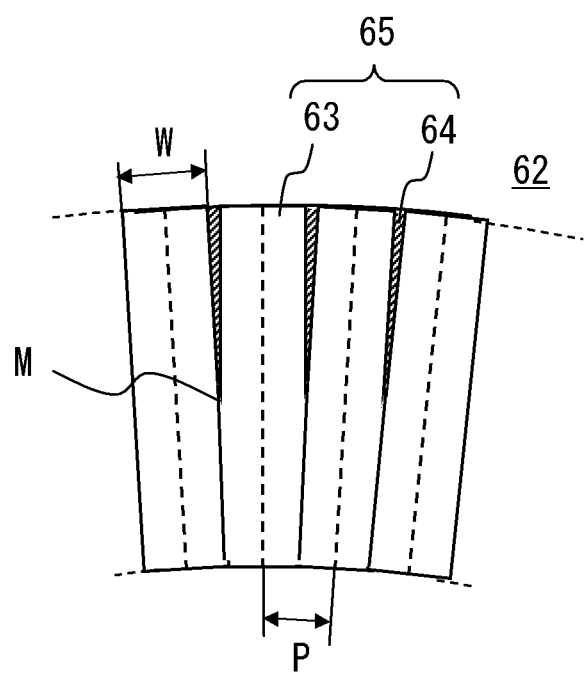
FIG. 38 is a plan view of the prism plate illustrated in FIG. 37.
Figure 40:
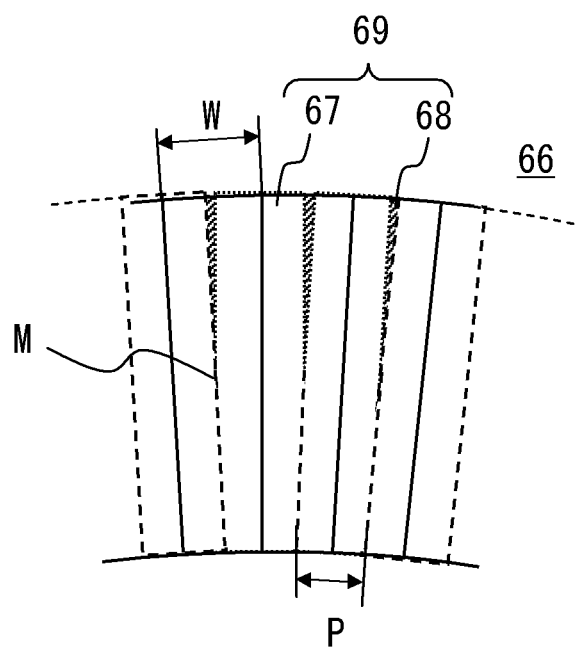
FIG. 40 is a plan view of the prism plate illustrated in FIG. 39.

FIG. 37 is a perspective view of a variation of the prism plate included in the illumination optical system illustrated in FIG. 29. FIG. 38 is a plan view of the prism plate illustrated in FIG. 37. FIG. 39 is a perspective view of another variation of the prism plate included in the illumination optical system illustrated in FIG. 29. FIG. 40 is a plan view of the prism plate illustrated in FIG. 39.

A prism plate 62 illustrated in FIG. 37 and FIG. 38 is different from the prism plate 54 illustrated in FIG. 30 in the sense that the prism plate 62 includes a prism surface 65 in place of the prism surface 57. As with the prism surface 57 illustrated in FIG. 30, the prism surface 65 includes: inclined portions 63 that correspond to the slopes of a peak formed by each of the plurality of prism columns and that are inclined with respect to the tangential direction of the prism plate 62; and flat portions 64 that correspond to the flat top of the peaks and that are parallel to the tangential direction of the prism plate 62.

With reference to the prism plate 62, as illustrated in FIG. 37, the height of the peaks of the prism columns is H2 from the outer-circumference surface to a midpoint M, i.e., is constant from the outer-circumference surface to the midpoint M, but the height decreases from the midpoint M to the internal-circumference surface; the height of the peaks is H3 (<H2) at the internal-circumference surface. The prism plate 62 satisfies W>P, where W is an interval between the peaks and P is the width of the prism column.

A prism plate 66 illustrated in FIG. 39 and FIG. 40 is different from the prism plate 54 illustrated in FIG. 30 in the sense that the prism plate 66 includes a prism surface 69 in place of the prism surface 57. The prism surface 69 is different from the prism surface 57 illustrated in FIG. 30 in the sense that the prism surface 69 includes: inclined portions 67 that correspond to the slopes of a peak formed by each of the plurality of prism columns and that are inclined with respect to the tangential direction of the prism plate 66; and flat portions 68 that correspond to troughs formed between the plurality of prism columns and that are parallel to the tangential direction of the prism plate 66. That is, when the prism plate 66 is viewed from a cross section orthogonal to the radius direction of the prism columns, each prism column assumes a triangular shape, and the flat portions 68 are provided between the plurality of prism columns.

With reference to the prism plate 66, the height of the peaks (the depth of the troughs) is H4 from the outer-circumference surface to a midpoint M, i.e., is constant from the outer-circumference surface to the midpoint M, but the height decreases (becomes shallower) from the midpoint M to the internal-circumference surface; the height of the peaks is H5 (<H4) at the internal-circumference surface. Note that all of the peaks of the prism column of the prism plate 66 include a top portion at the same position. The prism plate 62 satisfies W>P, where W is an interval between the peaks and P is the width of the prism column.

With reference to the prism plate 66, illumination light that enters at the inclined portion 67 is deflected in the tangential direction due to refraction by the prism surface 69, while illumination light that enters at the flat portion 68 passes through the prism plate 66 without being deflected in the tangential direction due to refraction by the prism surface 69. Thus, as with the prism plate 54, the prism plate 66 also allows the directivity of illumination light to be arbitrarily controlled.

With reference to the prism plate 62 illustrated in FIG. 37 and FIG. 38 and the prism plate 66 illustrated in FIG. 39 and FIG. 40, as in the case of the prism plate 54, flat portions are formed on portions of the peaks that are constant in height, i.e., on portions of the peaks that are sandwiched between the outer-circumference surface and the midpoint, but flat portions are not formed on portions of the peaks that are sandwiched between the midpoint M and the internal-circumference surface. Thus, the area of the flat portions decreases in comparison with the prism plate 54, so the prism plate 62 and the prism plate 66 may limit the amount of illumination light emitted in the radial direction.

Descriptions have been given of examples in which the proportion of the area of the flat portions decreases, but variations are not particularly limited to these. As an example, the area of the flat portions may be increased by forming a prism surface that satisfies W<P, where W is an interval between the peaks and P is the width of the prism column. Thus, the proportion of the area of the flat portions may be arbitrarily changed by variously changing the parameters of the prism surface, such as W, which indicates the interval between the peaks; P, which indicates the width of the prism columns; and H, which indicates the height of the peaks. Accordingly, the directivity of illumination light may be arbitrarily controlled.

Figure 42:
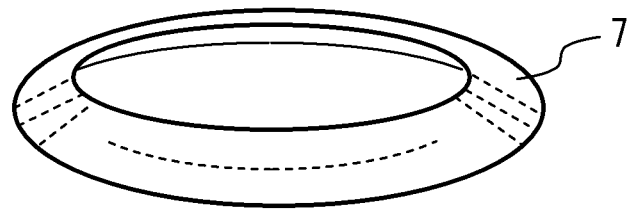
FIG. 42 is a perspective view of a prism plate included in the illumination optical system illustrated in FIG. 41.

Moreover, as in the case of embodiment 1, the outgoing surface of the prism plate of the illumination optical system in accordance with the present embodiment may be formed as a blasted surface (a diffusing surface) on which minute asperities are formed. This may weaken the directivity so that the directivity distribution can become closer to a circle. FIG. 41 illustrates a configuration of a variation of the illumination optical system included in the image pickup apparatus illustrated in FIG. 29. FIG. 42 is a perspective view of a prism plate included in the illumination optical system illustrated in FIG. 41.

An illumination optical system 70 illustrated in FIG. 41 includes: a plurality of LEDs 71 surrounding an image sensor (not illustrated) and arranged in a circular loop pattern; a prism plate 73 shaped like a circular loop; and a light guide 72 shaped like a circular tube between the plurality of LEDs 72 and the prism plate 73. The prism plate 73 includes a prism surface 74 on a side facing the light guide 72 and an outgoing surface 75 on a side facing an object.

The illumination optical system 70 is different from the illumination optical system illustrated in FIG. 29 in the sense that the outgoing surface of the light guide 72 is inclined in the radial direction and that the prism surface 74 and the outgoing surface 75 of the prism plate 73 are inclined in the radial direction, as illustrated in FIG. 41. Thus, the prism plate 73 is shaped like a truncated cone as illustrated in FIG. 42.

As with the illumination optical system illustrated in FIG. 29, the illumination optical system 70 in accordance with the present variation may arbitrarily control the directivity of illumination light. As an example, the illumination optical system 70 includes the truncated-cone-shaped prism plate 73 that may arbitrarily adjust the balance between the amount of illumination light emitted in the positive radial direction and the amount of illumination light emitted in the negative radial direction. Such an adjustment may be made in accordance with the distance from the outgoing surface 75 to an object.

What is claimed is:

1. An illumination optical system for an image pickup apparatus, the illumination optical system comprising:
   a plurality of light sources arranged in a circular loop pattern; and
   a prism plate shaped like a circular loop, wherein the prism plate includes
      a prism surface at which illumination light from the light sources enters and on which a plurality of prism columns arranged in a circular loop pattern in a circumference direction of the prism plate are formed, and
      an outgoing surface from which the illumination light is emitted, wherein
   the plurality of prism columns are each extended in a radial direction of the prism plate, wherein
   the prism surface includes
      a flat portion on at least one of a peak formed by each of the plurality of prism columns and a trough formed between the plurality of prism columns, the flat portion being substantially parallel to a tangential direction of the prism plate.

2. The illumination optical system for an image pickup apparatus according to claim 1, wherein
   the prism surface includes
      the flat portion, and
      an inclined portion inclined with respect to the tangential direction.

3. The illumination optical system for an image pickup apparatus according to claim 2, the illumination optical system further comprising:
   a light guide located between the plurality of light sources and the prism plate and configured to guide illumination light emitted from the plurality of light sources to the prism surface of the prism plate.

4. The illumination optical system for an image pickup apparatus according to claim 3, wherein
   the outgoing surface is a diffusing surface on which minute asperities are formed.

5. The illumination optical system for an image pickup apparatus according to claim 3, wherein
   the flat portion is inclined with respect to a radial direction of the prism plate.

6. The illumination optical system for an image pickup apparatus according to claim 3, wherein
   the outgoing surface is inclined with respect to a radial direction of the prism plate.

7. The illumination optical system for an image pickup apparatus according to claim 3, wherein
   the prism plate is shaped like a truncated cone, the flat portion is inclined with respect to a radial direction of the prism plate, and the outgoing surface is inclined with respect to the radial direction.

8. The illumination optical system for an image pickup apparatus according to claim 3, wherein the prism columns assume a trapezoidal shape when viewed from a cross section orthogonal to a radial direction of the prism plate, and the flat portion is provided for each of the prism columns.

9. The illumination optical system for an image pickup apparatus according to claim 3, wherein the prism columns assume a triangular shape when viewed from a cross section orthogonal to a radial direction of the prism plate, and the flat portion is provided between the plurality of prism columns.

10. The illumination optical system for an image pickup apparatus according to claim 3, wherein a directivity of illumination light emitted from the outgoing surface changes with a proportion of an area occupied on the prism surface by the flat portion.

* * * * *